US010988719B2

(12) United States Patent
Mertens

(10) Patent No.: US 10,988,719 B2
(45) Date of Patent: Apr. 27, 2021

(54) METHOD FOR PRODUCING BEERS STORED, OFFERED, SERVED OR CONSUMED IN UV-VIS-TRANSMITTANT BOTTLES WITH REDUCED SENSITIVITY, IN PARTICULAR NO SENSITIVITY, TO SKUNKY THIOL FLAVOR DEGRADATION UPON EXPOSURE TO SUNLIGHT OR OTHER SOURCES OF UV AND/OR VIS LIGHT, AND BEERS STORED, OFFERED, SERVED OR CONSUMED IN UV-VIS-TRANSMITTANT BOTTLES WITH REDUCED SENSITIVITY, IN PARTICULAR NO SENSITIVITY, TO SKUNKY THIOL FLAVOR DEGRADATION UPON EXPOSURE TO SUNLIGHT OR OTHER SOURCES OF UV AND/OR VIS LIGHT

(71) Applicant: IFAST NV, Roosdaal (BE)

(72) Inventor: Pascal Mertens, Roosdaal (BE)

(73) Assignee: IFAST NV, Roosdaal (BE)

( * ) Notice: Subject to any disclaimer, the term of this patent is extended or adjusted under 35 U.S.C. 154(b) by 177 days.

(21) Appl. No.: 15/509,941

(22) PCT Filed: Sep. 11, 2015

(86) PCT No.: PCT/EP2015/070896
§ 371 (c)(1),
(2) Date: Mar. 9, 2017

(87) PCT Pub. No.: WO2016/038216
PCT Pub. Date: Mar. 17, 2016

(65) Prior Publication Data
US 2017/0298310 A1 Oct. 19, 2017

(30) Foreign Application Priority Data

Feb. 20, 2015 (EP) .................................. 15156031

(51) Int. Cl.
C12C 3/12 (2006.01)
C12C 5/00 (2006.01)
C12C 11/07 (2006.01)
C12H 1/22 (2006.01)

(52) U.S. Cl.
CPC ............... C12C 3/12 (2013.01); C12C 5/004 (2013.01); C12C 11/07 (2013.01); C12H 1/22 (2013.01)

(58) Field of Classification Search
CPC .......... C12C 3/12; C12C 5/004; C12C 11/07; C12C 9/025; C12C 3/00; C12C 5/026; C12C 7/205; C12C 3/08; C12C 5/02; C12C 7/287; C12H 1/22; A23L 27/84
USPC .......... 426/600, 534, 590, 592, 650
See application file for complete search history.

(56) References Cited

U.S. PATENT DOCUMENTS 3,977,953 A * 8/1976 Von Hirsch ............... C12C 3/00
                                                     204/157.9
4,340,763 A    7/1982 Wuesthoff et al.
4,389,421 A * 6/1983 Palamand ................. A23L 2/44
                                                     426/330.4
4,717,580 A    1/1988 Forrest et al.

FOREIGN PATENT DOCUMENTS

| AU | 5877880 A | * | 10/1981 |
| BE | 805280 A | * | 1/1974 |
| CA | 796724 A | | 10/1968 |
| CN | 1860215 A | | 8/2006 |
| CN | 101134719 A | | 5/2008 |
| DE | 2244895 A1 | * | 3/1974 |
| DE | 2217135 A | * | 5/1974 |
| EP | 32639 A | * | 7/1981 |
| EP | 0108846 A1 | | 11/1982 |
| GB | 1064068 A | * | 4/1967 |
| GB | 1188304 | | 4/1970 |
| WO | 2005030919 A1 | | 4/2005 |
| WO | 2006104387 A1 | | 10/2006 |

OTHER PUBLICATIONS

De Keukeleire, Denis; Fundamentals of Beer and Hop Chemistry; Quimica Nova, 2000, vol. 23, No. 1; pp. 108-112.
Barth, Roger, Ph.D.; The Chemistry of Beer:The Science in the Suds; John Wiley & Sons, Inc.; 2013, Chapter 8, pp. 149-159; Chapter 11, pp. 195-209.
Mitter, W., et al.; Production of light stable beers on a commercial scale; Brauwelt International, 2007, pp. 16-18.
Hopsteiner Technical Publications Archives, pp. 1-3, Retrieved from the Internet, URL: https://www.hopsteiner.com/news/type/technical-publicatons/page/6/ [retrieved on Jul. 14, 2020].

(Continued)

Primary Examiner — Vera Stulii
(74) Attorney, Agent, or Firm — Gianna Julian-Arnold; Saul Ewing Arnstein & Lehr LLP

(57) ABSTRACT

The invention relates to a method for preparing a brewed beverage, in particular a light-coloured lager or ale beer, (to be) bottled, (to be) stored, (to be) offered, (to be) served or (to be) consumed in a UV-VIS-transmittant bottle, comprising the addition of hulupones and/or reduced hulupones during the brewing process in an effective amount to obtain a brewed beverage, wherein the fraction of hulupones and/or reduced hulupones in the total of isohumulones and (reduced) hulupones is at least 25 mol %, The invention further relates to a brewed beverage, in particular a light-coloured lager beer or ale beer, bottled, (to be) stored, (to be) offered, (to be) served or (to be) consumed in a UV-VIS-transmittant bottle, comprising (reduced) hulupones and wherein the frac-tion of hulupones and/or reduced hulupones in the total of isohumulones and (reduced) hulupones is at least 25 mol %.

13 Claims, No Drawings

(56) References Cited

OTHER PUBLICATIONS

Electronic mail from C. O'Connor to ScholarsArchive@oregonstate. edu re: Date on which a thesis was made available to the public, Jun. 2020.
Ruihong, Du, et al.; Preliminary Discussion on Bitter Matter in Beer, Beer Tech., 2008, No. 10, pp. 43-44 (no English translation available).
Intelmann, Daniel, et al., Comprehensive Sensomics Analysis of Hop-Derived Bitter Compounds during Storage of Beer; Journal of Agricultural and Food Chemistry, 2011, vol. 59, pp. 1939-1953.
Haseleu, Gesa, et al., Quantitative Sensomics Profiling of Hop-Derived Bitter Compounds Throughout a Full-Scale Beer Manufacturing Process, Journal of Agricultural and Food Chemistry, 2010, vol. 58, pp. 7930-7939.
Verzele, M., et al., Chemistry and Analysis of Hop and Beer Bitter Acids, Developments in Food Science 27, Elsevier, 1991, pp. 201-315.
www.chemtronic-gmbh.de, EBC Colour.
Stevens, R., et al., Evaluation of Hops, Hulupones and the Significance of B Acids in Brewing; Brewing Industry Research Foundation, Nutfield, Surrey, 1961, vol. 67, pp. 496-501.
Simmonds, D.H., et al., Separation and Identification of Hop Bittering Principles, J. Inst. Brew., 1962, vol. 68, pp. 495-503.
Spetsig, L.O., et al., Hulupones, A New Group of Hop Bitter Substances, J. Inst. Brew., 1960, vol. 66, pp. 413-417.
Aitken, R.A., et al., The Bitterness of Hop-Derived Materials in Beer, J. Inst. Brew., 1970, vol. 76, pp. 29-36.
Algazzali, V., et al., The bitterness intensity of oxidized hop acids: humulinones and hulupones, Graduate Thesis or Dissertation, 2014.
Algazzali, V., et al., The bitterness intensity of oxidized hop acids: humulinones and hulupones, An Abstract of the Thesis, 2014.
Palamand, S.R., et al., Bitter Tasting Compounds of Beer. Chemistry and Taste Properties of Some Hop Resin Compounds, J. Agr. Food Chem, 1973, vol. 21, No. 4, pp. 535-543.
Dusek, M., et al., Qualitative determination of B-acids and their transformation products in beer and hop using HR/AM-LC-MS/MS, J. Agric Food Chem., Abstract, 2014.
Dusek, M., et al., Qualitative determination of B-acids and their transformation products in beer and hop using HR/AM-LC-MS/MS, Journal of Agricultural and Food Chemistry, 2014, vol. 62, pp. 7690-7697.
Kuroiwa Y., et al., Composition of Sunstruck Flavor Substance and Mechanism of its Evolution, American Society of Brewing Chemists, 1961, vol. 19, No. 1, pp. 28-36.
Kuroiwa Y., et al., Factors Essential for the Evolution of Sunstruck Flavor, American Society of Brewing Chemists, 1963, vol. 21, No. 1, pp. 181-193.
Gunst, F., et al., On the Sunstruck Flavour of Beer, J. Inst. Brew., 1978, vol. 84, pp. 291-292.
Bondeel, G., et al., the Photolysis of trans-Isohumulone to Dehydrohumulinic Acid, a Key Route to the Development of Sunstruck Flavour in Beer, J. Chem. Soc. Perkins Trans. 1, 1987, pp. 2715-2717.
Verzele, M., et al., Chemistry and Analysis of Hop and Beer Bitter Acids, Developments in Food Science 27, Elsevier, 1991, pp. 17-138.
Burns, C., et al., Mechanism for formation of the lightstruck flavor in beer revealed by time-resolved electron paramagnetic resonance, Chemistry, 2001, pp. 4553-4561.
Heyerick, A., et al., Photolysis of hop-derived trans-iso-a-acids and trans-tetrahydroiso-a-acids: product identification in relation to the lightstruck flavour of beer, Photochem. Photobiol. Sci., 2003, vol. 2, pp. 306-314.
Huvaere, K., et al., Photooxidative degradation of beer bittering principles: product analysis with respect to lightstruck flavour formation, Photochem. Photobiol. Sci., 2004, vol. 3, pp. 854-858.
Wang, G., et al., Terpene Biosynthesis in Glandular Trichomes of Hop, Plant Physiology, 2008, vol. 148, pp. 1254-1266.
Micketts, R.J., et al., Detection of Terpene Compounds from Hops in American Lager Beer, Journal of Food Protection, 1978, vol. 41, No. 9, pp. 722-725.
Kishimoto, T., et al., Analysis of Hop-Derived Terpenoids in Beer and Evaluation of Their Behavior Using the Stir Bar-Sorptive Extraction Method with GC-MS, J. Agric. Food Chem., 2005, vol. 53, pp. 4701-4707.
Beer Institute Adjunct Reference Manual, 1998 Edition.

\* cited by examiner

METHOD FOR PRODUCING BEERS STORED, OFFERED, SERVED OR CONSUMED IN UV-VIS-TRANSMITTANT BOTTLES WITH REDUCED SENSITIVITY, IN PARTICULAR NO SENSITIVITY, TO SKUNKY THIOL FLAVOR DEGRADATION UPON EXPOSURE TO SUNLIGHT OR OTHER SOURCES OF UV AND/OR VIS LIGHT, AND BEERS STORED, OFFERED, SERVED OR CONSUMED IN UV-VIS-TRANSMITTANT BOTTLES WITH REDUCED SENSITIVITY, IN PARTICULAR NO SENSITIVITY, TO SKUNKY THIOL FLAVOR DEGRADATION UPON EXPOSURE TO SUNLIGHT OR OTHER SOURCES OF UV AND/OR VIS LIGHT

CROSS REFERENCE TO RELATED APPLICATIONS

This application claims the priority of PCT/EP2015/070896, filed on Sep. 11, 2015, which claims priority to European Patent Application No. 15156031.5, filed Feb. 20, 2015, which claims priority to Great Britain Patent Application No, 1416169.9, filed Sep. 12, 2014, the entire contents of each of which are hereby incorporated in total by reference.

FIELD OF THE INVENTION

The present invention relates to a method for preparing a brewed beverage, in particular a beer, stored, offered, served or consumed in a UV-VIS-transmittant bottle. The present invention also relates to a method of enhancing the (bitter) flavor quality and prolonging the (bitter) flavor stability of a brewed beverage, in particular a beer, stored, offered, served or consumed in a UV-VIS-transmittant bottle. The present invention also relates to brewed beverages, in particular beers, stored, served, offered or consumed in UV-VIS-transmittant bottles, with an enhanced (bitter) flavor quality and a prolonged (bitter) flavor stability.

BACKGROUND OF THE INVENTION

Hops are used in beer brewing for multiple purposes. The alpha-acids (also known as humulones; principal analogues are humulone, cohumulone and adhumulone) are the precursors of the characteristic bitter beer taste (provided by iso-alpha-acids obtained by alpha-acid isomerisation, typically during the wort boiling stage of the brewing process), and thus the principal hop compounds and consequently of high value for brewing. The other main hop compounds are the beta-acids (also called lupulones; with as principal analogues lupulone, colupulone and adlupulone) known as bacteriostatic agents (in particular to provide protection against detrimental bacterial infection between the wort boiling stage and the fermentation stage), the polyphenols which can potentially provide protection against oxidative degradation and the oils which optionally provide aroma characteristics (e.g. fruity, citrussy, floral, herbal or spicy) if desired.

In the conventional brewing process, a fraction of the alpha-acids added to the wort (typically by addition of hop pellets or extracts containing alpha-acids next to other hop compounds such as beta-acids and hop oils) are isomerized into the more soluble and bitter iso-alpha-acids (also called isohumulones) during the wort boiling stage (in the brew kettle), with usually concentrations of isohumulones (with a flavor threshold of about 4 ppm) between 5 and 50 mg/L (or 5-50 ppm) in the finished beer (i.e. the beer ready for consumption).

These isohumulones (with a susceptible exocyclic alpha-hydroxy ketone), the typical beer bittering agents, are however prone to photolytic decomposition, induced by irradiation of the beer (containing isohumulones) with ultraviolet (UV, especially UV-A) and/or visible (VIS, especially violet and blue VIS) light, through exposure to sunlight or other (artificial) light sources emitting UV and/or VIS light, which can occur in case the beer is stored, offered, served or consumed in a bottle that allows UV (in particular UV-A) and/or VIS (in particular violet and blue VIS) light, wholly or partly, to pass through, which causes dramatic beer flavor quality loss (as a consequence of the formation of malodorous 3-methyl-2-butene-1-thiol or 'skunky thiol', considered as the most offending off-flavor known to occur in beer products) and even making the beers unsuitable for consumption (undrinkable) because of this strong 'skunky thiol' off-flavor becoming prominent.

This sensitivity to 'skunky thiol' off-flavor degradation is problematic if beer is exposed to UV and/or VIS light during for example storage or during consumption. This sensitivity is therefore an important product beer flavor quality issue in the case of brewed beverages or beers, (mainly) bittered with isohumulones, stored, offered, served or consumed in bottles (for example made from glass or plastic) through which at least a fraction of the UV and/or VIS light, to which the bottle is exposed, can pass, such as clear or green glass bottles, or clear plastic bottles. It is in particular a beer flavor quality challenge for light-coloured lager beers (typically with an EBC Beer Colour value below 20, particularly below 10), but also for other light-coloured brewed beverages such as light-coloured ale beers, which are more susceptible to this type of photolytic degradation than dark-coloured beers, stored, offered, served or consumed in UV-VIS-transmittant bottles. Such light-coloured (lager) beers, often stored, offered, served or consumed in UV-VIS-transmittant bottles, are, apart from (highly) sensitive to 'skunky thiol' off-flavor formation upon exposure to sunlight (or (an)other source(s) of UV and/or VIS light), also often (relatively) low in flavor (taste and/or aroma), and thus the 'skunky thiol' off-flavor (degradation) is perceived earlier compared to more flavourful beers, with generally other aroma features (provided by for example fermentation products and hop oils) that can mask the (initial) 'skunky thiol' formation and 'lightstruck flavor' degradation. Moreover, these more flavourful beers, most often stored (and offered) in brown glass bottles that offer more protection for the beer against exposure to UV and/or VIS light, are moreover often darker in colour (for example with EBC Beer Colour values above 30 or 40). The aforementioned light-coloured lager beers, stored, offered, served or consumed in UV-VIS-transmittant bottles, usually have alcohol by volume values below 7%, in particular between 4% and 6%.

Upon exposure of beer bittered with isohumulones to sunlight or other (artificial) sources of UV and/or VIS light, the isohumulones undergo detrimental decomposition, either via a direct mechanism caused by UV light (in particular UV-A light) or via an indirect mechanism involving VIS-light (in particular violet and blue VIS light) induced riboflavin (generally present in beer and usually originating from the malt and the yeast) excitation. In both decomposition pathways, 3-methyl-2-butenyl radicals are formed. A fraction of the formed 3-methyl-2-butenyl radicals then recombines with sulfhydryl (or thiol) radicals (derived for example from sulfur containing amino acids such as cysteine) to form 3-methyl-2-butene-1-thiol (MBT) or 'skunky thiol', the cause of the 'lightstruck flavor' of beer with a threshold value of about 4 ppt in beer. Obviously, other hop acids, with a susceptible exocyclic alpha-hydroxy ketone with the ketone functional group part of a 4-methyl-1-oxopent-3-enyl side chain (for example with a molecular structure resembling to isohumulones), that can photolytically decompose to form 3-methyl-2-butenyl radicals can also cause the undesirable 'skunky thiol' formation.

One method to avoid 'lightstruck flavor' degradation of beers stored, offered, served or consumed in UV-VIS-transmittant bottles is the use of reduced isohumulones as (beer) bittering agents, such as the tetrahydro-isohumulones (in which the C=C bond in the iso-3-hexenoyl side chain of the isohumulones is saturated by catalytic hydrogenation) or the dihydro-isohumulones (in which the C=O bond in the iso-3-hexenoyl side chain of the isohumulones is reduced to a hydroxyl group), in the absence of isohumulones. Such reduced isohumulones are not naturally occurring, and are generally produced by means of chemical reduction processes starting from isohumulones. The use of for example tetrahydro-isohumulones, in the absence of isohumulones, as beer bittering agents indeed prevents the formation of the 'skunky thiol' flavor in beers stored, offered, served or consumed in UV-VIS-transmittant bottles, as upon degradation of the tetrahydro-isohumulones caused by exposure to sunlight (or (an)other (artificial) source(s) of UV and/or VIS light), the 3-methyl-2-butenyl radical, being the MBT precursor, is not formed. These tetrahydro-isohumulones, characterized by very strong bittering and very strong foam forming and stabilizing properties, are however now usually used in brewing and beers (but not with the specific objective of reducing or avoiding the risk of 'skunky thiol' flavor degradation) at relatively low concentrations for beer foam enhancement purposes, while the beers' bitterness is mainly provided by isohumulones. A currently used method to produce light-coloured beers (with an EBC Beer Colour value mostly below 10), in particular light-coloured lager beers, stored, offered, served or consumed in UV-VIS-transmittant bottles (such as clear or green glass bottles, or clear plastic bottles) with a low or no sensitivity to 'skunky thiol' degradation is bittering with a combination of dihydro-isohumulones (for their beer bitterness contribution) and tetrahydro-isohumulones (for their foam formation and/or foam stabilization contribution).

Apart from the bacteriostatic activity of lupulones, for example to control detrimental bacterial contamination (by for example lactic acid producing bacteria) of the brew wort to be fermented (prior to or during the fermentation stage), the lupulones can also contribute to beer bitterness upon oxidation to the more bitter hulupones (with as main analogues hulupone, cohulupone and adhulupone; collectively called hulupones), which are oxygenated derivatives of lupulones that can be formed, among various other (oxygenated) lupulone derivatives, during processing and storage of hops in the presence of oxygen (in the present hops processing and storage practice, the presence of oxygen is minimized or at least reduced to avoid hop product degradation) or during the wort boiling stage of the brewing process. However, only a minor part (typically limited to a few percent fraction) of the lupulones is transformed into hulupones during the wort boiling stage (given the low solubility of lupulones (related to their pKa value) and the low oxygen concentration in boiling wort) and consequently their beer bitterness contribution is limited. Moreover, other (oxygenated) lupulone derivatives different from the hulupones, formed during hop processing or storage, or during the brewing process, are linked to i.a. unpleasant bitterness characteristics. According to the scarce literature on the brewing application of hulupones, they are known to be hop acids with an agreeable bitter taste, nonetheless different from isohumulones (in terms of dissimilar bitterness profile and bitterness intensity), and a high solubility, compared to humulones and lupulones, in wort and beer owing to their low pKa value.

These hulupones can also be produced from a beta-acid containing matter, preferably a purified beta-acid containing matter (for example a beta-acid concentrate) not containing alpha-acids and/or iso-alpha-acids, applying specific oxidation processes, using e.g. molecular oxygen, in a solvent medium. Initially, the lupulones were oxidized to hulupones in alcoholic solutions in the presence of for example sodium sulfite. Later, it was found that aqueous alkaline conditions were more convenient. U.S. Pat. No. 4,340,763 describes the lupulone oxidation in an aqueous alkaline medium applying high concentrations of lupulones together with high concentrations of alkali metal ions, with precipitation of the hulupones as alkali metal salts from the process medium which enables simple product separation. This patent shows that by transforming the beta-acids into hulupones, which can be used as beer bittering agents, the economic or brewing value of the beta-acid fraction of hops can be increased, but describes no specific method of using hulupones in the brewing process or in the production of beer. U.S. Pat. No. 4,717,580 reports an analogous lupulone oxidation process in aqueous alkaline conditions, but at lower concentrations of lupulones and alkali metal cations. The use of hulupones in the brewing process is described in this patent as the combined addition of hulupones and isohumulones after the fermentation stage, thereby improving the bitterness yield by about 15% compared to a brewing process based on bittering with isohumulones only. This patent demonstrates that by combining the bittering potential of humulones (as isohumulones) with that of lupulones (as hulupones) the beer bittering can be economically enhanced. U.S. Pat. No. 4,717,580 also describes multiple fractionation techniques, amongst others to remove the humulones from hop extracts (for separate processing to isohumulones) and to produce purified lupulone and hulupone containing matters.

The prior art does not reveal that the use of (reduced) hulupones as bittering agents in the production of beer offers a possibility to reduce the sensitivity to (or even to avoid) 'lightstruck flavor' degradation of beer, in particular light-coloured (lager) beer, stored, offered, served of consumed in UV-VIS-transmittant bottles, such as a clear or green glass bottle, or a clear plastic bottle. The prior art thus does not reveal that bittering beer, in particular light-coloured (lager) beer, with (reduced) hulupones as bittering agents provides a solution for the 'skunky thiol' off-flavor degradation (which may occur during storage or consumption) challenge of beers, in particular light-coloured (lager) beers, stored, offered, served or consumed in UV-VIS-transmittant bottles (such as clear glass or green glass bottles, or clear plastic bottles). The prior art does also not describe the use of (reduced) hulupones as bittering agents in the production of beer, in particular light-coloured (lager) beer, stored, offered, served or consumed in a UV-VIS-transmittant bottle (for example a clear or green glass bottle, or a clear plastic bottle), as an alternative for isohumulones as bittering agents, to lower the sensitivity to 'skunky thiol' flavor degradation of the (light-coloured) (lager) beer. The prior art thus does not reveal that a process to brew beer, especially light-coloured (lager) beer, stored, offered, served or consumed in clear or green glass bottles, or clear plastic bottles, using (reduced) hulupones as bittering agents in the absence of isohumulones or with a lowered or low presence of isohumulones, is a method to prevent or reduce the formation of the detrimental 'skunky thiol' off-flavor, upon exposure to sunlight (or another source of UV and/or VIS light), in the beer stored, offered, served or consumed in a clear or green glass bottle, or in a clear plastic bottle. The prior art does also not inform on brewed beverages or beers, especially light-coloured (lager) beers, stored, offered, served or consumed in clear glass, green glass or clear plastic bottles, bittered with (reduced) hulupones having a reduced or no sensitivity, depending on the isohumulones content, to 'skunky thiol' flavor degradation upon exposure of the brewed beverage or beer containing bottles to sunlight or another source of UV and/or VIS light. It has thus also not been disclosed before to substitute the isohumulones in part or in whole as bittering agents in the brewed beverage or (light-coloured) (lager) beer, contained in clear or green glass or clear plastic bottles, by (reduced) hulupones, whereby the resulting brewed beverage, in particular (light-coloured) (lager) beer, contained in clear or green glass or clear plastic bottles, will become less sensitive or even insensitive to 'skunky thiol' flavor degradation upon exposure of the brewed beverage or beer containing bottles to sunlight or another source of UV and/or VIS light. In particular, to the best of the applicant's knowledge, it has not been disclosed or suggested in the prior art to use (reduced) hulupones for such purpose, in the production of a brewed beverage or a (light-coloured) (lager) beer, stored, offered, served or consumed in clear glass, green glass or clear plastic bottles. It has also not been reported before that increasing the fraction of (reduced) hulupones in the total of isohumulones and (reduced) hulupones as bittering agents in a brewed beverage or a beer, especially if the beer is a light-coloured (lager) beer, bottled, offered, served or consumed in clear glass, green glass or clear plastic, is a suitable way to obtain a brewed beverage product, beer product or light-coloured (lager) beer product, (to be) stored, offered, served or consumed in clear or green glass bottles, or clear plastic bottles, that is less sensitive to 'skunky thiol' flavor degradation upon exposure to sunlight or another source of UV and/or VIS light.

DESCRIPTION OF THE INVENTION

The inventors have found that by using hulupones (i.e. non-reduced, wherein both of the C=C bonds in the (3-methyl-2-butenyl) side chains are present) or reduced hulupones (for example hulupones in which one or two of the C=C bonds in the (3-methyl-2-butenyl) side chains are saturated) as bittering agents as a substitute, either in whole or in part, for the conventional isohumulones (either added as such during the brewing process, or formed from humulones during (the wort boiling stage of) the brewing process), the resulting beer (in particular light-coloured (lager) beer) stored, offered, served or consumed in a UV-VIS-transmittant bottle, is less sensitive or is insensitive to the formation of the 'skunky thiol' off-flavor, caused by hop acid degradation (for example during storage or consumption) upon exposure to sunlight or another source of UV and/or VIS light, which can occur when the beer is stored, offered, served or consumed in a UV-VIS-transmittant bottle that allows UV (in particular UV-A light) and/or VIS (in particular violet and blue VIS light) light, wholly or partly, to pass through. As used herein, a bottle is a (rigid) container, typically with a narrow neck and a broader body, used for storing, offering, serving or consuming (brewed) beverages or beers. As used herein, a UV-VIS-transmittant bottle is a bottle made of one or more materials (for example glass or plastic) through which at least a part of the light in the UV and/or VIS range (especially violet and blue VIS light and UV-A light), in particular in the wavelength range of 300-500 nm, can pass. Examples of such UV-VIS-transmittant bottles (for beers) are clear glass bottles, green glass bottles, otherwise coloured glass bottles, clear plastic bottles, otherwise coloured plastic bottles, but also brown glass or plastic bottles. After the filling of the bottles with the brewed beverage or beer, the bottle is typically closed (on the bottle's mouth) with for example a cap, such as a (metal) crown cap or a (plastic) screw cap. Moreover, typically a part of the bottle is on the outside covered with one or more labels (usually made from paper or plastic), which may provide shielding to the beer contained in the bottle from exposure to sunlight or other sources of UV and/or VIS light. Nevertheless, typically a substantial fraction of the bottle's outer surface is not covered by labeling.

The inventors have thus found that by increasing the fraction of hulupones and/or reduced hulupones in the total of isohumulones and (reduced) hulupones as bittering agents in a beer, stored, offered, served or consumed in a UV-VIS-transmittant bottle, the bottled beer becomes less sensitive to the formation of the 'skunky thiol' flavor upon exposure of the beer containing bottle to sunlight or other sources of UV and/or VIS light.

Accordingly, the present invention relates to a method for preparing a bottled brewed beverage, in particular a lager or ale beer, more in particular a light-coloured lager or ale beer (with preferably an EBC Beer Colour value below 20), comprising
adding hulupones and/or reduced hulupones during the brewing process in an effective amount to obtain a brewed beverage, in particular a lager or ale beer, more in particular a light-coloured lager or ale beer, wherein the fraction of hulupones and/or reduced hulupones in the total of isohumulones and (reduced) hulupones is at least 25 mol %, and
bottling the brewed beverage, in particular the lager or ale beer, more in particular the light-coloured lager or ale beer, in a UV-VIS-transmittant bottle.

In particular the invention relates to a method for preparing a bottled brewed beverage, in particular a beer (e.g. lager and ale beers), more in particular a light-coloured (lager or ale) beer (with an EBC Beer Colour value below 30, in particular below 20, more in particular below 10), with a lowered, low or no sensitivity to 'skunky thiol' flavor degradation, compared to an otherwise similar beer, when stored, offered, served or consumed in a UV-VIS-transmittant bottle, having the same bitterness intensity by bittering with isohumulones, upon exposure of the UV-VIS-transmittant bottle containing the brewed beverage or the beer to sunlight or another source of UV and/or VIS light, comprising the addition of (reduced) hulupones during the brewing process (for example before of after the fermentation stage) with a lowered or low presence of isohumulones or with isohumulones absent in the beer, when stored, offered, served or consumed in a UV-VIS-transmittant bottle. As used herein, a light-coloured (lager or ale) beer is a (lager or ale) beer having an EBC Beer Colour value below 30, in particular below 20, more in particular below 10. The EBC Beer Colour value is determinable by EBC Method 9.6. As used herein, the term '(reduced) hulupone' is used herein for 'at least one compound selected from the group of hulupones and reduced hulupones'.

In particular, the invention relates to a method for preparing a brewed beverage, in particular a beer (e.g. lager or ale), more in particular a light-coloured (lager or ale) beer, (to be) stored, (to be) offered, (to be) served or (to be) consumed in a UV-VIS-transmittant bottle (in particular a clear or green glass bottle, or a clear plastic bottle), comprising adding (reduced) hulupones during the brewing process as a substitute, in part or as a whole, for bittering with isohumulones.

Further, the invention relates to a method to lower the sensitivity of a brewed beverage, in particular a beer (e.g. lager or ale), more in particular a light-coloured (lager or ale) beer, (to be) stored, (to be) offered, (to be) served or (to be) consumed in a UV-VIS-transmittant bottle (in particular a clear or green glass bottle, or a clear plastic bottle), to 'skunky thiol' flavor degradation, upon exposure of the UV-VIS-transmittant bottle containing the brewed beverage or the beer to sunlight or another source of UV and/or VIS light, comprising adding (reduced) hulupones as bittering agents during the brewing process as a substitute, in part or as a whole, for bittering with isohumulones.

Further, the invention relates to a method for preparing a brewed beverage, in particular a beer (e.g. lager or ale), more in particular a light-coloured (lager or ale) beer, (to be) stored, (to be) offered, (to be) served or (to be) consumed in a UV-VIS-transmittant bottle (in particular a clear or green glass bottle or a clear plastic bottle), comprising the addition of (reduced) hulupones during the brewing process in an effective amount to obtain a brewed beverage, in particular a beer (e.g. lager or ale), more in particular a light-coloured (lager or ale) beer, (to be) stored, (to be) offered, (to be) served or (to be) consumed in a UV-VIS-transmittant bottle (in particular a clear or green glass bottle or a clear plastic bottle), wherein the fraction of hulupones and/or reduced hulupones in the total of isohumulones and (reduced) hulupones is at least 25 mol %. Preferably, the fraction of hulupones and/or reduced hulupones in the total of isohumulones and (reduced) hulupones is at least 50 mol %, more preferably at least 75 mol %, even more preferably at least 90 mol %, most preferably at least 95 mol % or at least 99 mol %.

Further, the invention relates to a method for offering a brewed beverage, in particular a beer (e.g. lager or ale), more in particular a light-coloured (lager or ale) beer, made with a method for preparing a brewed beverage according to the invention, for sale or for consumption, wherein the brewed beverage, comprising (reduced) hulupones, is offered in a UV-VIS-transmittant bottle, in particular in a clear glass bottle, a clear green glass bottle or a clear plastic bottle.

Further, the invention relates to a method for serving a brewed beverage, in particular a beer (e.g. lager or ale), more in particular a light-coloured (lager or ale) beer, made with a method for preparing a brewed beverage according to the invention, for consumption, wherein the brewed beverage, comprising (reduced) hulupones, is served in a UV-VIS-transmittant bottle, in particular in a clear glass bottle, a clear green glass bottle or a clear plastic bottle.

Further, the invention relates to a method for consuming a brewed beverage, in particular a beer (e.g. lager or ale), more in particular a light-coloured (lager or ale) beer, made with a method for preparing a brewed beverage according to the invention, wherein the brewed beverage, comprising (reduced) hulupones, is consumed in a UV-VIS-transmittant bottle, in particular a clear glass bottle, a green glass bottle or a clear plastic bottle. The method for consumption in particular includes a method wherein the brewed beverage comprising (reduced) hulupones, in particular the (lager or ale) beer, more in particular the light-coloured (lager or ale) beer, offered or served in a UV-VIS-transmittant bottle, is consumed in a public place, such as a bar, a restaurant or a public terrace.

Further, the invention relates to a brewed beverage, in particular a beer (e.g. lager or ale), more in particular a light-coloured (lager or ale) beer, stored, (to be) offered, (to be) served or (to be) consumed in a UV-VIS-transmittant bottle (in particular a clear or green glass bottle, or a clear plastic bottle), comprising (reduced) hulupones, wherein the fraction of hulupones and/or reduced hulupones in the total of isohumulones and (reduced) hulupones is at least 25 mol %. Preferably, the fraction of hulupones and/or reduced hulupones in the total of isohumulones and (reduced) hulupones is at least 50 mol %, in particular at least 70 mol % (corresponding to a concentration of (reduced) hulupones (in mg/L) in the brewed beverage that is at least a factor 2 higher than the concentration of isohumulones (in mg/L)). More preferably, the fraction of (reduced) hulupones in the total of isohumulones and (reduced) hulupones is at least 75 mol %, even more preferably at least 90 mol %, in particular at least 92 mol % (corresponding to a concentration of (reduced) hulupones (in mg/L) in the brewed beverage that is at least a factor 10 higher than the concentration of isohumulones (in mg/L)). Most preferably, the fraction of hulupones and/or reduced hulupones in the total of isohumulones and (reduced) hulupones is at least 95 mol % or at least 99 mol %.

Further, the invention relates to a method for preparing a brewed beverage, in particular a beer (e.g. lager or ale), more in particular a light-coloured (lager or ale) beer, (to be) stored, (to be) offered, (to be) served or (to be) consumed in a UV-VIS-transmittant bottle (in particular a clear or green glass bottle, or a clear plastic bottle), comprising the addition of hulupones and reduced hulupones during the brewing process.

Further, the invention relates to a brewed beverage, in particular a (lager or ale) beer, more in particular a light-coloured (lager or ale) beer, stored, (to be) offered, (to be) served or (to be) consumed in a UV-VIS-transmittant bottle (in particular a clear or green glass bottle or a clear plastic bottle), comprising hulupones and reduced hulupones.

Further, the invention relates to a brewed beverage, in particular a (lager or ale) beer, more in particular a light-coloured (lager or ale) beer, stored, (to be) offered, (to be) served or (to be) consumed in a UV-VIS-transmittant bottle (in particular a clear or green glass bottle, or a clear plastic bottle), the brewed beverage being essentially free of isohumulones (i.e. with a concentration of isohumulones below 0.5 ppm, in particular below 0.1 ppm, more in particular below 0.05 ppm) and comprising hulupones and/or reduced hulupones.

Further, the invention relates to a brewed beverage, in particular a (lager or ale) beer, more in particular a light-coloured (lager or ale) beer, stored, (to be) offered, (to be) served or (to be) consumed in a UV-VIS-transmittant bottle (in particular a clear or green glass bottle, or a clear plastic bottle), the brewed beverage comprising hulupones and reduced hulupones, and being essentially free of isohumulones.

Further, the invention relates to a brewed beverage, in particular a (lager or ale) beer, more in particular a light-coloured (lager or ale) beer, stored, (to be) offered, (to be) served or (to be) consumed in a UV-VIS-transmittant bottle (in particular a clear or green glass bottle or a clear plastic bottle), comprising preferably at least 2 ppm (reduced) hulupones, more preferably at least 4 ppm (reduced)

hulupones, most preferably at least 6 ppm (reduced) hulupones, in particular at least 8 ppm (reduced) hulupones, more in particular at least 10 ppm (reduced) hulupones. Preferably, the brewed beverage, in particular the (lager or ale) beer, more in particular the light-coloured (lager or ale) beer, stored, (to be) offered, (to be) served or (to be) consumed in a UV-VIS-transmittant bottle (in particular a clear or green glass bottle, or a clear plastic bottle), comprises less than 200 ppm (reduced) hulupones, more preferably less than 150 ppm (reduced) hulupones, most preferably less than 100 ppm (reduced) hulupones, in particular less than 75 ppm (reduced) hulupones, more in particular less than 60 ppm (reduced) hulupones.

A brewed beverage, in particular a (lager or ale) beer, more in particular a light-coloured (lager or ale) beer, stored, (to be) offered, (to be) served or (to be) consumed in a UV-VIS-transmittant bottle, according to the invention, may be alcohol-free or contain alcohol. Usually, the alcohol by volume value of the brewed beverage, in particular the (lager or ale) beer, more in particular the light-coloured (lager or ale) beer, is less than 7%, in particular in the range of 2-6%, more in particular in the range of 3-5%.

Beer usually contains riboflavin (and possibly also other flavins), which is considered as a characteristic ingredient of beer. The concentration can be a known concentration for a specific kind of beer, and dependent on the brewing process. In particular, the riboflavin concentration, of a brewed beverage, in particular in particular a (lager or ale) beer, more in particular a light-coloured (lager or ale) beer, according to the invention, can be about 0.01 mg/L or more, more in particular about 0.1 mg/L or more, even more in particular about 0.2 mg/L or more. In particular, the riboflavin concentration is about 5 mg/L or less, more in particular about 2 mg/L or less.

Further, the invention relates to a method for preparing a brewed beverage, in particular a (lager or ale) beer, more in particular a light-coloured (lager or ale) beer, (to be) stored, (to be) offered, (to be) served or (to be) consumed in a UV-VIS-transmittant bottle (in particular a clear or green glass bottle, or a clear plastic bottle), comprising the addition of (reduced) hulupones and other hop acids different from isohumulones (or other hop acids with a susceptible exocyclic alpha-hydroxy ketone with the ketone functional group part of a 4-methyl-1-oxopent-3-enyl side chain), such as (reduced) humulones, (reduced) lupulones or reduced isohumulones, during the brewing process. As used herein, the term '(reduced) humulone' is used herein for 'at least one compound selected from the group of humulones and reduced humulones'. As used herein, the term '(reduced) lupulone' is used herein for 'at least one compound selected from the group of lupulones and reduced lupulones'.

Further, the invention relates to a brewed beverage, in particular a (lager or ale) beer, more in particular a light-coloured (lager or ale) beer, stored, (to be) offered, (to be) served or (to be) consumed in a UV-VIS-transmittant bottle (in particular a clear or green glass bottle, or a clear plastic bottle), comprising (reduced) hulupones and other hop acids different from isohumulones, such as (reduced) humulones, (reduced) lupulones or reduced isohumulones.

Further, the invention relates to a brewed beverage, in particular a (lager or ale) beer, more in particular a light-coloured (lager or ale) beer, stored, (to be) offered, (to be) served or (to be) consumed in a UV-VIS-transmittant bottle (in particular a clear or green glass bottle, or a clear plastic bottle), comprising preferably at least 2 ppm (reduced) hulupones and at least 0.5 ppm (reduced) humulones, more preferably at least 4 ppm (reduced) hulupones and at least 1.0 ppm (reduced) humulones, most preferably at least 6 ppm (reduced) hulupones and at least 1.5 ppm (reduced) humulones. Preferably, the brewed beverage, in particular the (lager or ale) beer, more in particular the light-coloured (lager or ale) beer, stored, (to be) offered, (to be) served or (to be) consumed in a UV-VIS-transmittant bottle (in particular a clear or green glass bottle, or a clear plastic bottle), comprises less than 100 ppm (reduced) hulupones and less than 25 ppm (reduced) humulones, more preferably less than 75 ppm (reduced) hulupones and less than 15 ppm (reduced) humulones, most preferably less than 60 ppm (reduced) hulupones and less than 5 ppm (reduced) humulones.

Further, the invention relates to a brewed beverage, in particular a (lager or ale) beer, more in particular a light-coloured (lager or ale) beer, stored, (to be) offered, (to be) served or (to be) consumed in a UV-VIS-transmittant bottle (in particular a clear or green glass bottle, or a clear plastic bottle), comprising preferably at least 2 ppm (reduced) hulupones and at least 0.5 ppm reduced isohumulones, more preferably at least 4 ppm (reduced) hulupones and at least 1.0 ppm reduced isohumulones, most preferably at least 6 ppm (reduced) hulupones and at least 1.5 ppm reduced isohumulones. Preferably, the brewed beverage, in particular the (lager or ale) beer, more in particular the light-coloured (lager or ale) beer, stored, (to be) offered, (to be) served or (to be) consumed in a UV-VIS-transmittant bottle (in particular a clear or green glass bottle, or a clear plastic bottle), comprises less than 100 ppm (reduced) hulupones and less than 30 ppm reduced isohumulones, more preferably less than 75 ppm (reduced) hulupones and less than 20 ppm reduced isohumulones, most preferably less than 60 ppm (reduced) hulupones and less than 10 ppm reduced isohumulones.

Further, the invention relates to a brewed beverage, in particular a (lager or ale) beer, more in particular a light-coloured (lager or ale) beer, stored, (to be) offered, (to be) served or (to be) consumed in a UV-VIS-transmittant bottle (in particular a clear or green glass bottle, or a clear plastic bottle), comprising preferably at least 2 ppm (reduced) hulupones and at least 0.5 ppm tetrahydro-isohumulones, more preferably at least 4 ppm (reduced) hulupones and at least 1.0 ppm tetrahydro-isohumulones, most preferably at least 6 ppm (reduced) hulupones and at least 1.5 ppm tetrahydro-isohumulones. Preferably, the brewed beverage, in particular the (lager or ale) beer, more in particular the light-coloured (lager or ale) beer, stored, (to be) offered, (to be) served or (to be) consumed in a UV-VIS-transmittant bottle (in particular a clear or green glass bottle, or a clear plastic bottle), comprises less than 100 ppm (reduced) hulupones and less than 20 ppm tetrahydro-isohumulones, more preferably less than 75 ppm (reduced) hulupones and less than 10 ppm tetrahydro-isohumulones, most preferably less than 60 ppm (reduced) hulupones and less than 5 ppm tetrahydro-isohumulones.

Further, the invention relates to a method for preparing a brewed beverage, in particular a (lager or ale) beer, more in particular a light-coloured (lager or ale) beer, (to be) stored, (to be) offered, (to be) served or (to be) consumed in a UV-VIS-transmittant bottle (in particular a clear or green glass bottle, or a clear plastic bottle), comprising the addition of (reduced) hulupones during the brewing process in an effective amount to obtain a brewed beverage, in particular a (lager or ale) beer, more in particular a light-coloured (lager or ale) beer, (to be) stored, (to be) offered, (to be) served or (to be) consumed in a UV-VIS-transmittant bottle (in particular a clear or green glass bottle, or a clear plastic bottle), wherein the fraction of (reduced) hulupones in the total of (reduced) hulupones and other lupulone oxidation products and/or other derivatives of lupulones is preferably at least 20 mol %, more preferably at least 40 mol %, most preferably at least 60 mol %, in particular at least 80 mol %, more in particular at least 90 mol %.

Further, the invention relates to a brewed beverage, in particular a (lager or ale) beer, more in particular a light-coloured (lager or ale) beer, stored, (to be) offered, (to be) served or (to be) consumed in a UV-VIS-transmittant bottle (in particular a clear or green glass bottle, or a clear plastic bottle), comprising (reduced) hulupones and optionally other oxidation products of lupulones, with preferably a fraction of (reduced) hulupones in the total of (reduced) hulupones and other lupulone oxidation products of at least 20 mol %, more preferably at least 40 mol %, most preferably at least 60 mol %, in particular at least 80 mol %, more in particular at least 90 mol %.

Further, the invention relates to a brewed beverage, in particular a (lager or ale) beer, more in particular a light-coloured (lager or ale) beer, stored, (to be) offered, (to be) served, or (to be) consumed in a UV-VIS-transmittant bottle (in particular a clear or green glass bottle, or a clear plastic bottle), comprising (reduced) hulupones and optionally other derivatives of lupulones, with preferably a fraction of (reduced) hulupones in the total of (reduced) hulupones and other derivatives of lupulones of at least 20 mol %, more preferably at least 40 mol %, more preferably at least 60 mol %, in particular at least 80 mol %, more in particular at least 90 mol %.

Further, the invention relates to a method for preparing a brewed beverage, in particular a (lager or ale) beer, more in particular a light-coloured (lager or ale) beer, (to be) stored, (to be) offered, (to be) served or (to be) consumed in a UV-VIS-transmittant bottle (in particular a clear or green glass bottle, or a clear plastic bottle), comprising the addition of (reduced) hulupones and (oxygenated) hop oils, such as (oxygenated) hop monoterpenes and sesquiterpenes, during the brewing process.

Further, the invention relates to a brewed beverage, in particular a (lager or ale) beer, more in particular a light-coloured (lager or ale) beer, stored, (to be) offered, (to be) served or (to be) consumed in a UV-VIS-transmittant bottle (in particular a clear or green glass bottle, or a clear plastic bottle), comprising (reduced) hulupones and (oxygenated) hop oils, such as (oxygenated) hop monoterpenes and sesquiterpenes.

Further, the invention relates to a method for preparing a brewed beverage, in particular a (lager or ale) beer, more in particular a light-coloured (lager or ale) beer, (to be) stored, (to be) offered, (to be) served or (to be) consumed in a UV-VIS-transmittant bottle (in particular a clear or green glass bottle, or a clear plastic bottle), comprising the addition of (reduced) hulupones and hop polyphenols during the brewing process.

Further, the invention relates to a brewed beverage, in particular a (lager or ale) beer, more in particular a light-coloured (lager or ale) beer, stored, (to be) offered, (to be) served or (to be) consumed in a UV-VIS-transmittant bottle (in particular a clear or green glass bottle, or a clear plastic bottle), comprising (reduced) hulupones and hop polyphenols.

Further, the invention relates to a method for preparing a brewed beverage, in particular a (lager or ale) beer, more in particular a (clear) light-coloured (lager or ale) beer, (to be) stored, (to be) offered, (to be) served or (to be) consumed in a UV-VIS-transmittant bottle (in particular a clear or green glass bottle, or a clear plastic bottle), comprising the addition of (reduced) hulupones and the use of malted cereal(s) (e.g. barley malt) and/or adjuncts. The term 'adjunct' is used herein for 'any carbohydrate source other than malted cereal(s)', such as barley, wheat, corn, rice, sorghum, oats, sugar(s), etc. Adjuncts are usually used in solid form or in liquid form (for example extracts like malt extract). The use of adjuncts is particularly useful for brewing (clear) light-coloured (lager) beers.

Further, the invention relates to a method for preparing a brewed beverage, in particular a (lager or ale) beer, more in particular a (clear) light-coloured (lager or ale) beer, (to be) stored, (to be) offered, (to be) served or (to be) consumed in a UV-VIS-transmittant bottle (in particular a clear or green glass bottle, or a clear plastic bottle), comprising the addition of (reduced) hulupones and the use of exogenous enzymes, for example with protease activity or with amylase or glucanase activity, which is particularly useful in combination with the use of adjuncts.

Further, the invention relates to a method for preparing a brewed beverage, in particular a (lager or ale) beer, more in particular a light-coloured (lager or ale) beer, (to be) stored, (to be) offered, (to be) served or (to be) consumed in a UV-VIS-transmittant bottle (in particular a clear or green glass bottle or a clear plastic bottle), comprising the addition of (reduced) hulupones and the use of foam control agents. The use of the aforementioned foam control agents is particularly useful to optimize the bittering utilization of the added (reduced) hulupones (especially in the case of addition to the wort (to be fermented)).

Further, the invention relates to a method for preparing a brewed beverage, in particular a (lager or ale) beer, more in particular a (clear) light-coloured (lager or ale) beer, (to be) stored, (to be) offered, (to be) served or (to be) consumed in a UV-VIS-transmittant bottle (in particular a clear or green glass bottle, or a clear plastic bottle), comprising the addition of (reduced) hulupones and the use of at least one (processing) aid or agent selected from the group of adsorbents, precipitants, clarifying agents, fining agents, filter aids, colloidal stabilization agents and decolorizing agents (for example silicium based, amide based, polyphenol based or active carbon based materials) for removal of yeasts, proteins, polyphenols, etc. The use of the aforementioned (processing) aids and/or agents to remove haze precursors is particularly useful for brewing (clear) light-coloured (lager) beers bittered with (reduced) hulupones.

Further, the invention relates to a method for preparing a brewed beverage, in particular a (lager or ale) beer, more in particular a light-coloured (lager or ale) beer, (to be) stored, (to be) offered, (to be) served or (to be) consumed in a UV-VIS-transmittant bottle (in particular a clear or green glass bottle, or a clear plastic bottle), comprising the addition of (reduced) hulupones and the addition of one or more antioxidants and/or other agents that retard oxidative changes (such as sulphites). This also contributes to (prolonging) the stability of the bitter flavour quality provided by the (reduced) hulupones. Such agents are moreover also useful in scavenging carbonyl compounds, a.o. a carbonyl intermediate in the 'skunky thiol' formation. The use of the aforementioned agents can thus provide additional protection against 'skunky thiol' flavor degradation, in particular in case isohumulones, even at (very) low concentrations, are present in the bottled beer.

Further, the invention relates to a brewed beverage, in particular a (lager or ale) beer, more in particular a light-coloured (lager or ale) beer, stored, (to be) offered, (to be) served or (to be) consumed in a UV-VIS-transmittant bottle (in particular a clear or green glass bottle, or a clear plastic bottle), comprising (reduced) hulupones and one or more antioxidants and/or other agents that retard oxidative changes, such as sulphites.

Further, the invention relates to a method for preparing a brewed beverage, in particular a (lager or ale) beer, more in particular a light-coloured (lager or ale) beer, (to be) stored, (to be) offered, (to be) served or (to be) consumed in a UV-VIS-transmittant bottle (in particular a clear or green glass bottle, or a clear plastic bottle), comprising the addition of (reduced) hulupones and one or more foaming promoting agents and/or foam stabilizing agents, such as alginate based materials. The use of the aforementioned agents is useful to achieve sufficient beer head formation and retention, in particular if adjuncts are used in combination with (reduced) hulupones in the brewing process.

Further, the invention relates to a brewed beverage, in particular a (lager or ale) beer, more in particular a light-coloured (lager or ale) beer, (to be) offered, (to be) served or (to be) consumed in a UV-VIS-transmittant bottle (in particular a clear or green glass bottle, or a clear plastic bottle), comprising (reduced) hulupones and one or more foaming promoting agents and/or foam stabilizing agents, such as alginate based materials. The presence of one ore more of the aforementioned agents can be instrumental to obtain the desired beer foam (formation and stabilization), in particular if the brewed beverage is prepared with adjuncts and relatively low in bitterness provided by (reduced) hulupones (and optionally other hop bitter acids).

Further, the invention relates to a brewed beverage, in particular a (lager or ale) beer, more in particular a light-coloured (lager or ale) beer, stored, (to be) offered, (to be) served or (to be) consumed in a UV-VIS-transmittant bottle (in particular a clear or green glass bottle, or a clear plastic bottle), comprising (reduced) hulupones and flavourings, obtained by addition of for example fruits, herbs, plants, spices, etc., added as such or in a processed form.

Further, the invention relates to a brewed beverage, stored, (to be) offered, (to be) served or (to be) consumed in a UV-VIS-transmittant bottle, prepared from a brewed beverage, according to the present invention, by mixing with one or more other beverages, in particular lemonade, fruit juice or spirit.

Further, the invention relates to a brewed beverage, in particular a (lager or ale) beer, more in particular a (clear) light-coloured (lager or ale) beer, stored, (to be) offered, (to be) served or (to be) consumed in a UV-VIS-transmittant bottle, comprising (reduced) hulupones and colouring agents.

Further, the invention relates to a (glass or plastic) bottle containing a brewed beverage, in particular a (lager or ale) beer, more in particular a (clear) light-coloured (lager or ale) beer, according to the invention. The bottle is usually a UV-VIS-transmittant bottle, in the meaning of a bottle through which at least part of the light in the UV and/or VIS range, in particular in the wavelength range of 300-500 nm, can pass. Examples of such UV-VIS-transmittant bottles are amongst others clear glass bottles, green glass bottles and clear plastic bottles. Such UV-VIS-transmittant bottles are usually made of one or more materials that are transparent or translucent to light of at least a part of the UV and/or VIS range, in particular in the wavelength range of 300-500 nm. Preferably, (one of) the material(s) used to make the bottle(s) is a glass material or a plastic material suitable to make bottles. The invention is in particular advantageous with respect to a bottle comprising a brewed beverage, in particular a (lager or ale) beer, more in particular a (clear) light-coloured (lager or ale) beer, wherein the bottle is a clear glass bottle, a green glass bottle or a clear plastic bottle generally known in the art. However, also brewed beverages, in particular (lager or ale) beers, more in particular (clear) light-coloured (lager or ale) beers, stored, (to be) offered, (to be) served or (to be) consumed in differently coloured UV-VIS-transmittant bottles are considered to benefit from the invention, e.g. UV-VIS-transmittant pink or blue bottles. In principle, the UV-VIS-transmittant bottle may also be made of a combination of two or more (differently coloured) UV-VIS-transmittant materials or any combination of clear UV-VIS-transmittant material(s) and coloured UV-VIS-transmittant material(s). It is also possible that a part of the bottle is not UV-VIS-transmittant, e.g. because it is covered with a UV-VIS-opaque label or paint or partially made of a UV-VIS-opaque material.

A brewed beverage, in particular a (lager or ale) beer, more in particular a (clear) light-coloured (lager or ale) beer (stored, (to be) offered, (to be) served or (to be) consumed in a UV-VIS-transmittant bottle, according to at least some embodiments of the invention, has a low or no sensitivity to the formation of the 'skunky thiol' off-flavor upon exposure to sunlight or (an)other sources of UV and/or VIS light when contained in a clear or green glass bottle, or a clear plastic bottle, compared to a similar conventionally brewed beverage of the same type (bittered mainly with isohumulones) in the same UV-VIS-transmittant bottle or type of bottle. An advantageous effect manifests itself in particular in a UV-VIS-transmittant bottle containing a (clear) light-coloured (lager or ale) beer, more in particular in a bottle containing a (clear) light-coloured (lager or ale) beer according to the invention.

Since a brewed beverage, in particular a (lager or ale) beer, more in particular a (clear) light-coloured (lager or ale) beer, stored, (to be) offered, (to be) served or (to be) consumed in a UV-VIS-transmittant bottle, according to at least some embodiments of the invention, has a low or no sensitivity to the formation of the 'skunky thiol' off-flavor upon exposure to sunlight or another source of UV and/or VIS light, it can be bottled, stored, offered, served and consumed in a UV-VIS-transmittant bottle, i.e. a bottle through which at least a part of the light in the UV and/or VIS range, in particular in the wavelength range of 300-500 nm, can pass, without causing 'skunky thiol' formation upon exposure to sunlight or another source of UV and/or VIS light, and this without needing special additional precautions to avoid the 'skunky thiol' formation.

Further, the invention relates to the use of (reduced) hulupones for the production of a brewed beverage, in particular a (lager or ale) beer, more in particular a (clear) light-coloured (lager or ale) beer, (to be) bottled, (to be) stored, (to be) offered, (to be) served, or (to be) consumed in a UV-VIS-transmittant bottle.

Further, the invention relates to the combined use of hulupones and reduced hulupones for the production of a brewed beverage, in particular a (lager or ale) beer, more in particular a (clear) light-coloured (lager or ale) beer, (to be) bottled, (to be) stored, (to be) offered, (to be) served, or (to be) consumed in a UV-VIS-transmittant bottle.

Further, the invention relates to the combined use of (reduced) hulupones and reduced isohumulones for the production of a brewed beverage, in particular a (lager or ale) beer, more in particular a (clear) light-coloured (lager or ale) beer, (to be) bottled, (to be) stored, (to be) offered, (to be) served, or (to be) consumed in a UV-VIS-transmittant bottle.

Further, the invention relates to the combined use of at least one compound selected from the group of hulupones and (reduced) hulupones plus at least one compound selected from the group of humulones and reduced humulones for the production of a brewed beverage, in particular a (lager or ale) beer, more in particular a (clear) light-coloured (lager or ale) beer, (to be) bottled, (to be) stored, (to be) offered, (to be) served, or (to be) consumed in a UV-VIS-transmittant bottle.

Further, the invention relates to the combined use of at least one compound selected from the group of hulupones and reduced hulupones plus at least one compound selected from the group of lupulones and reduced lupulones for the production of a brewed beverage, in particular a (lager or ale) beer, more in particular a (clear) light-coloured (lager or ale) beer, (to be) bottled, (to be) stored, (to be) offered, (to be) served, or (to be) consumed in a UV-VIS-transmittant bottle.

Further, the invention relates to the combined use of (reduced) hulupones and at least one compound selected from the group of hop oils and (oxygenated) hop oils (hereafter '(oxygenated) hop oils') for the production of a brewed beverage, in particular a (lager or ale) beer, more in particular a (clear) light-coloured (lager or ale) beer, (to be) bottled, (to be) stored, (to be) offered, (to be) served, or (to be) consumed in a UV-VIS-transmittant bottle. Suitable (oxygenated) hop oils in particular are selected from the group of (oxygenated) hop monoterpenes and sesquiterpenes, such as (oxygenated) myrcene, beta-pinene, beta-caryophyllene and alpha-humulene; and related derivatives thereof.

Further, the invention relates to the combined use of (reduced) hulupones and hop polyphenols, and related derivatives thereof, for the production of a brewed beverage, in particular a (lager or ale) beer, more in particular a (clear) light-coloured (lager or ale) beer, (to be) bottled, (to be) stored, (to be) offered, (to be) served, or (to be) consumed in a UV-VIS-transmittant bottle.

Further, the invention relates to the combined use of (reduced) hulupones and at least one carbohydrate source selected from the group of malted cereals and adjuncts for the production of a brewed beverage, in particular a (lager or ale) beer, more in particular a (clear) light-coloured (lager or ale) beer, (to be) bottled, (to be) stored, (to be) offered, (to be) served, or (to be) consumed in a UV-VIS-transmittant bottle.

Further, the invention relates to the combined use of (reduced) hulupones, malted cereal(s) and at least one type of adjunct (any carbohydrate source other than malted cereal(s)) for the production of a brewed beverage, in particular a (lager or ale) beer, more in particular a (clear) light-coloured (lager or ale) beer, (to be) bottled, (to be) stored, (to be) offered, (to be) served, or (to be) consumed in a UV-VIS-transmittant bottle. The use of adjuncts is in particular preferred in the production of (clear) light-coloured (lager or ale) beers, (to be) bottled, (to be) stored, (to be) offered, (to be) served or (to be) consumed in UV-VIS-transmittant bottles.

Further, the invention relates to the combined use of (reduced) hulupones and exogenous enzymes (for example with protease activity or with amylase or glucanase activity) for the production of a brewed beverage, in particular a (lager or ale) beer, more in particular a (clear) light-coloured (lager or ale) beer, (to be) bottled, (to be) stored, (to be) offered, (to be) served, or (to be) consumed in a UV-VIS-transmittant bottle. The use of exogenous enzymes, in particular proteases, amylases or glucanases, is in particular preferred in the production of light-coloured (lager or ale) beers, (to be) bottled, (to be) stored, (to be) offered, (to be) served, or (to be) consumed in UV-VIS-transmittant bottles, prepared with adjunct(s).

Further, the invention relates to the combined use of (reduced) hulupones and at least one (processing) aid or agent selected from the group of adsorbents, precipitants, clarifying agents, fining agents, filter aids, colloidal stabilization agents and decolorizing agents for the production of a brewed beverage, in particular a (lager or ale) beer, more in particular a (clear) light-coloured (lager or ale) beer, (to be) bottled, (to be) stored, (to be) offered, (to be) served, or (to be) consumed in a UV-VIS-transmittant bottle. The use of such processing aids or agents is in particular preferred in the production of (clear) light-coloured (lager or ale) beers, (to be) bottled, (to be) stored, (to be) offered, (to be) served, or (to be) consumed in UV-VIS-transmittant bottles.

Further, the invention relates to the combined use of (reduced) hulupones and one or more antioxidants and/or other agents that retard oxidative changes for the production of a brewed beverage, in particular a (lager or ale) beer, more in particular a (clear) light-coloured (lager or ale) beer, (to be) bottled, (to be) stored, (to be) offered, (to be) served, or (to be) consumed in a UV-VIS-transmittant bottle.

Further, the invention relates to the combined use of (reduced) hulupones and one or more foaming promoting and/or foam stabilizing agents for the production of a brewed beverage, in particular a (lager or ale) beer, more in particular a (clear) light-coloured (lager or ale) beer, (to be) bottled, (to be) stored, (to be) offered, (to be) served, or (to be) consumed in a UV-VIS-transmittant bottle. The use of foaming promoting agents and/or foam stabilizing agents is in particular preferred in the production of (clear) light-coloured (lager or ale) beers bittered with (reduced) hulupones, especially for (clear) light-coloured lager beers with relatively low bitterness levels, bottled, (to be) stored, (to be) offered, (to be) served, or (to be) consumed in UV-VIS-transmittant bottles.

Further, the invention relates to the combined use of (reduced) hulupones and one or more acidic and/or alkaline earth metal compounds for the production of a brewed beverage, in particular a (lager or ale) beer, more in particular a (clear) light-coloured (lager or ale) beer, (to be) bottled, (to be) stored, (to be) offered, (to be) served, or (to be) consumed in a UV-VIS-transmittant bottle.

In an advantageous embodiment, the hulupones and/or reduced hulupones are used for the production of a brewed beverage, in particular a (lager or ale) beer, more in particular a (clear) light-coloured (lager or ale) beer, (to be) bottled, (to be) stored, (to be) offered, (to be) served, or (to be) consumed in a UV-VIS-transmittant bottle, in combination with at least two members selected from the group of reduced isohumulones, (reduced) humulones, (reduced) lupulones, (oxygenated) hop oils, hop polyphenols, exogenous enzymes, adsorbents, precipitants, clarifying agents, fining agents, filter aids, colloidal stabilization agents, decolorizing agents, antioxidants, agents retarding oxidative changes, foaming promoting agents and foam stabilizing agents.

The invention is in particular suitable to provide a brewed beverage, in particular a (lager or ale) beer, more in particular a (clear) light-coloured (lager or ale) beer, (to be) bottled, (to be) stored, (to be) offered, (to be) served, or (to be) consumed in a UV-VIS-transmittant bottle, bittered with (reduced) hulupones in the absence of isohumulones or with a low or reduced presence of isohumulones, with no or a low or a lowered sensitivity to 'skunky thiol' flavor degradation upon exposure of the UV-VIS-transmittant bottles containing the brewed beverage to sunlight or (an)other source(s) of UV and/or VIS light.

We observed that in beers (amongst others light-coloured lager beers with EBC Beer Colour values below 15), contained in (capped) UV-VIS-transmittant bottles of varying colour type (i.a. clear glass bottles, green glass bottles, brown glass bottles and clear plastic bottles) bittered with (reduced) hulupones (for example by adding (reduced) hulupones before (e.g. to the (boiling) wort) or after the fermentation stage of the brewing process) in the absence of isohumulones, the exposure of the (capped) differently coloured UV-VIS-transmittant bottles containing the beers, in particular light-coloured lager beers, to sunlight or another source of UV and/or VIS light did not cause the typical 'skunky thiol' off-flavor degradation of beer as a consequence of degradation of the added bittering agents, being (reduced) hulupones.

We first noticed the absence of the 'skunky thiol' off-flavor in an experimental series on exposure of (capped) UV-VIS-transmittant bottles containing the beers to sunlight and an artificial light set-up (emitting UV-A light and violet and blue VIS light), to determine the specific bitter flavor profile (intensity, profile, quality and stability) of (reduced) hulupones versus (reduced) isohumulones, comparing unbittered beers (brewed with addition of lupulones (to the wort) prior to the fermentation stage) subsequently bittered by adding varying quantities of (reduced) isohumulones (using i.a. an aqueous solution of potassium isohumulates) with unbittered beers (brewed with addition of lupulones (to the wort) prior to the fermentation stage) subsequently bittered with varying quantities of (reduced) hulupones (using e.g. an aqueous solution of potassium hulupates or an aqueous solution of potassium tetrahydro-hulupates). We found that upon exposure, of the clear glass, green glass and clear plastic bottles, containing the beers bittered with isohumulones, to UV-VIS light, the 'skunky thiol' off-flavor became quickly perceptible, but not for the beers, bittered with isohumulones, contained in brown glass bottles. For the beers, bittered with the (reduced) hulupones, on the other hand, the characteristic 'skunky thiol' off-flavor could not be discerned for any of the beers contained in the UV-VIS-transmittant bottles of varying colour type.

In a continuation of the foregoing experimental series, the foam formation and foam stabilization of the beers (bottled in clear glass and green glass bottles) bittered with (reduced) hulupones and isohumulones were compared applying the NIBEM (beer foam stability) test. It was found that hulupones had a foam-positive effect, however less pronounced than isohumulones at comparable addition levels or concentrations (in the beer). However, by adding hulupones in combination with, for example, humulones or tetrahydro-isohumulones, a sufficient beer foam formation and stabilization was achieved, as was shown during the NIBEM tests. Reduced hulupones, such as tetrahydro-hulupones, were found to provide a more pronounced foam-positive effect compared to hulupones.

We also noticed the absence of the 'skunky thiol' off-flavor, upon exposure of (capped) UV-VIS-transmittant bottles of varying colour type (being clear glass, green glass and clear plastic) containing the ((light-coloured) lager) beers (bittered with either (reduced) hulupones or isohumulones) to UV-VIS light, for beers bittered with (reduced) hulupones in a lager beer brewing trial series, comparing the addition of isohumulones (using an aqueous solution of potassium isohumulates) with the addition of (reduced) hulupones (using an aqueous solution of potassium hulupates or an aqueous solution of potassium tetrahydro-hulupates) to the wort during the wort boiling stage (in the brew kettle). We again detected the 'skunky thiol' off-flavor, upon exposure of the three types of bottles containing the beers bittered with isohumulones to UV-VIS light; and no perception of the 'skunky thiol' off-flavor for the beers bittered with (reduced) hulupones. The same was observed when the addition of isohumulones or (reduced) hulupones was combined with the addition of (reduced) lupulones to the wort or with the addition of (reduced) humulones and reduced isohumulones post-fermentation.

During the aforementioned lager brewing trial series with hulupone additions to the (boiling) wort (typically pH>5), we noticed that the specific bacteriostatic activity of hulupones in the (boiled) wort was lower compared to the isohumulones, as for in particular low levels of addition of hulupones to the (boiling) wort, a bacterial infection was found during or after the fermentation stage in the corresponding test brews, which may indicate insufficient bacteriostatic action provided by the added hulupones. This was and can be remedied by co-addition of for example (reduced) lupulones to the (boiling) wort (to be fermented), also tetrahydro-isohumulones as co-addition to the (boiling) wort (to be fermented) proved successful. For the tetrahydro-hulupones on the contrary, a higher specific bacteriostatic activity in the wort medium was found in comparison with isohumulones. In a continuation of this test series, the bacteriostatic activity of hulupone was tested in beer media (at pH values below 4.5 typically), and under these conditions the bacteriostatic protection provided by (reduced) hulupones at typical bitterness levels proved sufficient, and comparable with the bacteriostatic activity of isohumulones (in beer media).

We then prepared separate aqueous solutions of isohumulones and (reduced) hulupones (contained in clear glass and clear plastic UV-VIS-transmittant bottles) to which riboflavin and cysteine were added (to experimentally include the potential VIS-induced indirect (isohumulone) photolytic decomposition), and these aqueous mixtures were, after flushing with nitrogen gas, irradiated by an artificial light set-up (emitting UV-A light and violet and blue VIS light, just as sunlight). For increasing irradiation times and intensities, we found that while the concentration of the (reduced) hulupones remained about the same, the concentration of isohumulones in the aqueous solutions gradually decreased, and increasing levels of degradation products were determined by mass spectroscopy together with the 'skunky thiol' off-flavor degradation becoming more prominent.

Thereafter, aqueous solutions containing a 20 ppm concentration of (reduced) hulupones and varying concentrations of isohumulones (on molar basis from 1 to 5,000 (very low concentration of isohumulones) to 1 to 1 (equimolar concentration of isohumulones) relative to the concentration of (reduced) hulupones) were prepared in clear glass and clear plastic UV-VIS-transmittant bottles, to which riboflavin and cysteine were added (again to include the potential VIS-induced indirect isohumulone decomposition). After flushing with nitrogen gas, these aqueous mixtures, contained in clear glass or clear plastic bottles, were irradiated by an artificial light set-up (emitting UV-A light and violet and blue VIS light). We found that only for the aqueous mixtures with concentrations of isohumulones higher than 1.0 ppm, the 'skunky thiol' was immediately unmistakably perceptible upon irradiation, notwithstanding a substantial concentration of degradation products was found in the aqueous mixtures with lower addition levels of isohumulones.

Subsequently, aqueous solutions containing a 20 ppm concentration of (reduced) hulupones and varying concentrations of tetrahydro-isohumulones (on molar basis from 1 to 50 (low concentration of tetrahydro-isohumulones) to 1 to 4 (corresponding to a tetrahydro-isohumulone concentration of about 5 ppm) relative to the concentration of (reduced) hulupones) were prepared in clear and green glass UV-VIS-transmittant bottles, followed by addition of riboflavin and cysteine (to experimentally include the potential VIS-induced indirect isohumulone decomposition). After flushing with nitrogen gas, these clear and green glass bottles containing the aqueous mixtures were irradiated by an artificial light set-up (emitting UV-A light and violet and blue VIS light). We found that while the concentration of the tetrahydro-isohumulones declined upon irradiation, in contrast with the concentration of the (reduced) hulupones that remained about the same, the 'skunky thiol' off-flavor could not be detected.

Next, to unbittered light-coloured (with EBC Beer Colour values below 20) lager beers (brewed with addition of lupulones (to the wort) prior to the fermentation stage) contained in clear glass and green glass UV-VIS-transmittant bottles were added 20 ppm of (reduced) hulupones and varying concentrations of isohumulones (on molar basis from 1 to 200 (very low concentration of isohumulones) to 1 to 1 (equimolar concentration of isohumulones) relative to the concentration of (reduced) hulupones). Next, the UV-VIS-transmittant bottles containing the beers were irradiated by an artificial light set-up (emitting UV-A light and violet and blue VIS light). We found that only for the bottled beers with concentrations of isohumulones higher than 4.0 ppm (molar ratio of isohumulones to (reduced) hulupones of about 1 to 5 and higher), the 'skunky thiol' was quickly unmistakably perceptible upon irradiation with UV-VIS light. For the bottled beers with lower concentrations of isohumulones, the 'skunky thiol' off-flavor was only detected after some time of irradiation, and for the samples with concentrations of isohumulones below 0.5 ppm and lower, the 'skunky thiol' flavor was only perceived after longer irradiation times.

The process steps in a method for preparing a brewed beverage or a beer ((to be) stored, (to be) offered, (to be) served or (to be) consumed in a UV-VIS-transmittant bottle) may be based on the process steps of known methods for brewing the brewed beverage or the beer. In a method for preparing a brewed beverage or a beer ((to be) stored, (to be) offered, (to be) served or (to be) consumed in a UV-VIS-transmittant bottle), typically a wort is prepared, which is boiled or processed at high temperature. After boiling the wort or processing the wort at high temperature, the (cooled) wort is subjected to (primary) fermentation (optionally, multiple fermentation stages can be applied). After the (primary) fermentation stage, the brewed beverage or the beer is usually subjected to a filtration step. Finally, the beer is transferred into a UV-VIS-transmittant bottle. Good results have been achieved with wort made from malted cereals such as barley malt. However, it is also possible to substitute at least part of the malted cereal(s) with one or more adjuncts such as corn, rice or sorghum, and even to substitute the malted cereal(s) as a whole by one or more adjuncts. Good results, with good bittering utilizations, have also been achieved with high gravity brewing conditions, for example using wort(s) with increased original gravity (e.g. more than 12° Plato, in particular more than 14° Plato, more in particular more than 16° Plato), using (reduced) hulupones as bittering agents, also due to the high solubility of (reduced) hulupones in wort media. For low-alcohol or low-carb beers for example, high gravity brewing conditions can also be for example the use of wort(s) with an original gravity of more than 9° Plato, in particular more than 10° Plato.

The brewed beverage, in particular the (lager or ale) beer, more in particular the (clear) light-coloured (lager or ale) beer, stored, (to be) offered, (to be) served or (to be) consumed in a UV-VIS-transmittant bottle, according to the invention or produced in a method of the invention is usually, in the final stage of the brewing process or in the final stage of the beer production, bottled in a UV-VIS-transmittant bottle, in particular a clear glass or green glass bottle, or a clear plastic bottle. Clear glass bottles, green glass bottles and clear plastic bottles which are usual examples of UV-VIS-transmittant bottles for beers and other brewed beverages are generally known in the art.

Alternatively, the brewed beverage, in particular the (lager or ale) beer, more in particular the light-coloured (lager or ale) beer, stored, (to be) offered, (to be) served or (to be) consumed in a UV-VIS-transmittant bottle, according to the invention or produced in a method of the invention is, in the final stage of the brewing process or in the final stage of the beer production, bottled in a glass or plastic UV-VIS-transmittant bottle of another colour, for example a brown glass UV-VIS-transmittant bottle. Although brown glass tends to offer better, but usually not complete, protection than clear or green glass, the 'skunky thiol' off-flavor degradation risk still exists if the beer is conventionally bittered, i.e. (mainly) bittered with isohumulones.

The (reduced) hulupones, whether or not in the free acid form (as hulupate complex or salt), can be introduced at any stage of the brewing process (and can optionally even be produced in a process, separate from the wort boiling or high temperature wort processing, as part of the brewing process, on the brewing site, usually starting from (reduced) lupulones), but typically, prior to the fermentation stage, to the (boiling) wort (for example added as a (reduced) hulupones containing extract, or as (reduced) hulupones containing powders or pellets, or as a purified (reduced) hulupones extract, or as a (reduced) hulupones concentrate, or as an (aqueous) solution containing (reduced) hulupones), during the fermentation stage, or after the fermentation stage, for example as an aqueous or alcoholic solution of (reduced) hulupones (such as an aqueous solution containing hulupates, i.e. the complexes or salts of the hulupones, or as an aqueous solution containing reduced hulupates, i.e. the complexes or salts of the reduced hulupones). All points or stages of the brewing process are suitable for the addition of the (reduced) hulupones as bittering agents to achieve a satisfactory level of bittering by the (reduced) hulupones. To achieve a high bittering utilization of the added (reduced) hulupones, a proper mixing with the brew or beer medium is required, as is also observed for the additions of for example (reduced) isohumulones. At least in some embodiments, a better bittering utilization is achieved by adding at least a fraction of the (reduced) hulupones after the fermentation stage of the brewing process. Addition of (reduced) hulupones to the wort (e.g. before, during or after the wort boiling stage or the high temperature wort processing stage) can be advantageous for contamination control (protection against bacteria) of the wort, optionally in combination with for example reduced humulones, (reduced) lupulones or reduced isohumulones, in particular if humulones and isohumulones are absent or only present in low concentrations in the wort. The addition of the (reduced) hulupones can also be performed mainly post-fermentation, in that case it can be advantageous to add for example (reduced) humulones, reduced isohumulones or (reduced) lupulones to the wort (for example prior to or during the fermentation stage), in particular if the concentration of isohumulones in the (boiling or boiled) wort is very low. Reduced humulones, reduced isohumulones, reduced lupulones or other oxidized hop acids, such as oxidized lupulones, can be added to the (boiling) wort for contamination control; humulones are preferably added to the cooling or cooled wort (for example prior to or during the fermentation stage). In the case of post-fermentation addition of (reduced) hulupones, the addition point is preferably at any point between the end of the fermentation stage and the final filtration stage of the brewing process. Alternatively, (reduced) hulupones can be added to a brewed beverage stream, in particular a beer stream, after final filtration, before or during the bottle filling step. The (reduced) hulupones can be diluted in solvents (or in mixtures of solvents), in particular compatible solvents such as water and ethanol, prior to their addition during the brewing process, by contacting the (reduced) hulupones containing matter with a solvent or a mixture of solvents. The (reduced) hulupones can also be transformed, optionally in a solvent or a mixture of solvents, into derivatives, such as salts (for example alkali metal hulupates) or (other) complexes, prior to their addition during the brewing process.

Preferably, the concentration of (reduced) hulupones in the brewed beverage, in particular the (lager or ale) beer, more in particular the light-coloured (lager or ale) beer, stored, (to be) offered, (to be) served or (to be) consumed in a UV-VIS-transmittant bottle, is at least 2 ppm, more preferably at least 4 ppm, most preferably at least 6 ppm, and in particular at least 8 ppm, and more in particular 10 ppm. Preferably, the concentration of (reduced) hulupones in the brewed beverage, in particular the (lager or ale) beer, more in particular the light-coloured (lager or ale) beer, stored, (to be) offered, (to be) served or (to be) consumed in a UV-VIS-transmittant bottle, is below 200 ppm, more preferably below 150 ppm, most preferably below 100 ppm, in particular below 75 ppm, more in particular below 60 ppm, e.g. below 30 ppm.

Adding (reduced) hulupones in the brewing process can be combined with the use of other hop acids, preferably with no susceptible exocyclic alpha-hydroxy ketone with the ketone functional group part of a 4-methyl-1-oxopent-3-enyl side chain, such as (reduced) humulones (in particular humulones) or reduced isohumulones (in particular dihydro-isohumulones and tetrahydro-isohumulones), for example to improve the foam properties of the brewed beverage, in particular the (lager or ale) beer, more in particular the light-coloured (lager or ale) beer, stored, (to be) offered, (to be) served or (to be) consumed in a UV-VIS-transmittant bottle, or to impart specific bitterness properties to the brewed beverage, in particular the (lager or ale) beer, more in particular the light-coloured (lager or ale), stored, (to be) offered, (to be) served or (to be) consumed in a UV-VIS-transmittant bottle.

(Reduced) humulones, in particular humulones, can be used to improve the beer foam, usually by adding humulones to achieve humulone concentrations of less than 10 ppm in the brewed beverage or the beer. Reduced isohumulones, amongst others tetrahydro-isohumulones, are usually applied in concentrations below 20 ppm in the brewed beverage or the beer, but in combination with the bittering effect of the (reduced) hulupones lower addition levels or concentrations of reduced isohumulones can be applied. Usually, reduced isohumulones such as tetrahydro-isohumulones are added, typically post-fermentation, in concentrations below 5 ppm in the brewed beverage or the beer, to improve the beer foam. The addition of (reduced) hulupones in the brewing process can also be combined with the use of (reduced) lupulones, for example to protect against detrimental bacterial contamination of the (boiling) wort (to be fermented).

If it is an objective to prepare a brewed beverage, in particular a (lager or ale) beer, more in particular a light-coloured (lager or ale) beer, stored, (to be) offered, (to be) served or (to be) consumed in a UV-VIS-transmittant bottle, with a very low to no sensitivity to 'skunky thiol' flavor degradation, it is required that the content of isohumulones is very low, and therefore the control of bacterial contamination of the (boiling) wort (to be fermented) might not be sufficiently provided by isohumulones. This protection against bacterial contamination of the wort can however also be achieved, apart from adding (reduced) hulupones, by adding other hop acids, such as reduced humulones, (reduced) lupulones and reduced isohumulones; humulones can also be applied, and are preferably added to a cooling or cooled wort after the wort boiling stage or the high temperature wort processing stage (to avoid formation of isohumulones).

Brewed beverages, in particular (lager or ale) beers, more in particular light-coloured (lager or ale) beers, stored, (to be) offered, (to be) served or (to be) consumed in a UV-VIS-transmittant bottle, with a very low or no sensitivity to the 'skunky thiol' flavor degradation can for example be prepared by adding a fraction of the (reduced) hulupones to the (boiling) wort, and adding another fraction of the (reduced) hulupones after the (primary) fermentation stage. Alternatively, the (reduced) hulupones added to the (boiling) wort can for example, either in whole or in part, be substituted by for example reduced humulones, reduced isohumulones or (reduced) lupulones.

The presence of isohumulones in the brewed beverage, in particular the (lager or ale) beer, more in particular the light-coloured (lager or ale) beer, stored, (to be) offered, (to be) served or (to be) consumed in a UV-VIS-transmittant bottle, bittered with (reduced) hulupones should preferably be low, and more preferably as low as possible, as the sensitivity to 'skunky thiol' flavor degradation is directly related to the content of isohumulones. By lowering the concentration of the isohumulones in the brewed beverage bittered with (reduced) hulupones, in particular the (lager or ale) beer, more in particular the light-coloured (lager or ale) beer, stored, (to be) offered, (to be) served or (to be) consumed in a UV-VIS-transmittant bottle, the sensitivity to 'skunky thiol' flavor degradation upon exposure to sunlight or other (artificial) sources of UV and/or VIS light is reduced. Preferably, the concentration of isohumulones in the brewed beverage, in particular the (lager or ale) beer, more in particular the light-coloured (lager or ale) beer, stored, (to be) offered, (to be) served or (to be) consumed in a UV-VIS-transmittant bottle, bittered with (reduced) hulupones is 0.0-4.0 ppm, more preferably below 2.0 ppm, most preferably below 1.0 ppm. It is in particular preferred that the brewed beverage or beer (bittered with (reduced) hulupones), stored, (to be) offered, (to be) served or (to be) consumed in a UV-VIS-transmittant bottle, is essentially free of isohumulones or has a low isohumulone content if the brewed beverage or beer, stored, (to be) offered, (to be) served or (to be) consumed in a UV-VIS-transmittant bottle, is a light-coloured (lager) beer.

To produce a brewed beverage, in particular a (lager or ale) beer, more in particular a light-coloured (lager or ale) beer, stored, (to be) offered, (to be) served or (to be)

consumed in a UV-VIS-transmittant bottle, bittered with (reduced) hulupones with a very low sensitivity to 'skunky thiol' flavor degradation, the concentration of isohumulones in the brewed beverage, in particular the (lager or ale) beer, more in particular the light-coloured (lager or ale) beer, stored, (to be) offered, (to be) served or (to be) consumed in a UV-VIS-transmittant bottle, is preferably below 0.5 ppm, more preferably below 0.1 ppm, most preferably below 0.01 ppm.

For the production of the hulupones (amongst others to be used for the brewing and degradation tests with hulupone additions), initially methods or processes described in U.S. Pat. No. 4,340,763 (catalyzed processes) and U.S. Pat. No. 4,717,580 (non-catalyzed processes) were applied. Both patents describe the transformation of lupulones into hulupones in aqueous alkaline process conditions using oxygen. Later, based on results from the initial experiments, adapted methods were used (amongst others higher oxygen pressures than reported in the prior art (e.g. oxygen pressure of more than 6 bar $O_2$, in particular more than 8 bar $O_2$, more in particular more than 10 bar $O_2$) and lower lupulones to metal catalyst ratios than in the prior art (e.g. molar lupulones to metal catalyst (typically a precious metal such as Pd or Pt, in particular Pt) of less than 100, in particular less than 75, more in particular less than 50) proved useful to achieve high(er) hulupone selectivities and obtain high hulupone productivities) with the objective(s) of obtaining a hulupone product of high (flavouring) quality (in the meaning of being essentially free, or with an as low as possible concentration, of by-products or side-products with detrimental (flavour) properties) and achieving high hulupone product yields (a.o. in the recovery starting from the (process(ed)) medium or mixture containing hulupones). It was found that in the lupulone transformation higher hulupone selectivities were achieved with catalyzed processes (for example using Pd or Pt catalysts) compared to non-catalyzed processes and that lower (molar) lupulone to (precious) metal ratios (compared to the prior art) further improved the hulupone selectivities and yields. For the production of reduced hulupones a (multi-step) procedure, comprising first the (catalyzed) transformation of lupulone to hulupone and then reduction (e.g. preferably catalyzed hydrogenation, more preferably Pt catalyzed hydrogenation) of the hulupone to the reduced hulupone, proved successful. Applying the methods of U.S. Pat. No. 4,340,763 and further improved self-developed methods based on U.S. Pat. No. 4,340,763, we found that (very) high molar ratios of alkali metal cations to hulupones were required to separate the hulupones from the process mixture, but still the efficiency of the hulupone recovery was limited. Applying the methodology from U.S. Pat. No. 4,717,580, based on separating/purifying the hulupones from the process mixture by acidification of the (process) medium or mixture containing the hulupones, a rather effective hulupone recovery was achieved, but in the separated hulupone containing product phase, compounds (of the volatile (short-chain) fatty acid type) were found which cause an unpleasant (rancid) off-flavor (fatty acid smell). These 'fatty acid type' products (typically comprising six carbon atoms or less, optionally branched and/or unsaturated) are formed as a by-product or a side-product (together with other lupulone derivatives) during the transformation of lupulones into hulupones, and remain in the same phase as the hulupones during the purification process (performed by lowering the pH to about 4.5) as both remain dissolved in the aqueous process medium. We found that, by adding alkaline earth metal cations (e.g. with molar alkaline earth metal cations to hulupones ratios below 5, in particular below 3) to the aqueous (alkaline) process medium/mixture or product mixture/phase containing hulupones, a highly efficient separation/purification of the hulupones can be achieved, combined with the absence of the undesired 'fatty acid type' products in the separated/purified hulupone product phase. In this separation/purification process, alkaline earth metal hulupates are formed, which (tend to) precipitate from the aqueous (alkaline) process medium/mixture, while the off-flavor causing compounds (of the 'fatty acid' type) remain dissolved and can readily be removed, for example by decantation, filtration or washing. After the separation/purification process (step), the alkaline earth metal hulupates can optionally be transformed into hulupones in the free acid form by acidification and optionally (further) processed to alkali metal hulupates or other types of hulupate complexes or salts. We also found that in case hop oils are present in the starting material containing lupulones (for the hulupone preparation), such as for example a beta-extract or hop base extract, these hop oils can mostly be recovered in the hulupone product phase (applying the aforementioned separation/purification process), while the hop oil composition remains largely the same during the preceding hulupone formation and/or separation/purification process.

Accordingly, the invention further relates to a method for the preparation of a hulupone, comprising reacting a lupulone with oxygen thereby forming a hulupone, wherein the process is carried out in a (basic) liquid medium (comprising one or more solvents), preferably an aqueous (alkaline) liquid medium, and wherein the hulupone is precipitated, using alkaline earth metal compounds (e.g. magnesium (hydr)oxides, complexes or salts), as an alkaline earth metal complex or salt (containing phase). The alkaline earth metal compounds or ions used for the precipitation can be present in the aqueous (alkaline) liquid medium during the hulupone formation process or can be added thereafter prior or during the separation/purification process. Reduced hulupones are preferably obtained by reduction/hydrogenation of hulupones. As used herein, 'aqueous (alkaline) liquid medium' means that more than 50 weight % of the (basic) liquid medium is water, preferably 80-100 weight %, more preferably 90-100 weight %. The alkaline earth metal hulupate complex(es) or salt(s) can be recovered from the (basic) liquid medium using conventional technology, e.g. filtration or decantation. As explained above, it has been found that a product phase containing alkaline earth metal hulupone complexes is recovered which is essentially free of (volatile) fatty acid, or in which at least the fatty acid content is reduced significantly, whereby the problem of introducing unpleasant (rancid) off-flavor (fatty acid smell) in the later application of the hulupones is overcome. Suitable conditions can be based on the information provided herein, optionally in combination with the methods described in U.S. Pat. Nos. 4,340,763 and 4,717,580, and common general knowledge. The initial lupulone concentration usually is at least 1 weight % in the (basic) liquid medium, in particular at least 5 weight %, more in particular at least 10 weight %. The molar initial lupulones to metal catalyst ratios (which catalyst typically is Pd or Pt) usually is at least 0.1 and less than 100, in particular at least 1 and less than 75, more in particular at least 5 and less than 50. The oxygen pressure usually is at least 6 bar $O_2$ and less than 100 bar $O_2$, in particular at least 8 bar $O_2$ and less than 50 bar $O_2$, more in particular at least 10 bar $O_2$ and less than 20 bar $O_2$. The pH (of an aqueous liquid medium) during the hulupone formation usually is in the range of 6-14, in particular in the range 8-14, preferably 10-14. The temperature during the hulupone formation usually is in the range of 25-100° C., in particular 50-100° C., more in particular 75-100° C. The molar alkaline earth metal cations to hulupones ratio during the separation/purification process usually is below 5 and at least 0.1, in particular below 3 and at least 0.2. The alkaline earth metal ions are preferably selected from the group of Ca ions and Mg ions. In particular good results have been achieved with Mg ions. Accordingly, the fraction of Mg ions in the total of alkaline earth metal cations is preferably 50-100 mol %, more preferably 70-100 mol %, most preferably 90-100 mol %. If desired, the alkaline earth metal hulupate complex or salt can be further processed. One may for example use the alkaline earth metal complex to prepare hulupone in the free acid form, by addition of an inorganic or organic acid, and recover the free acid, or react the free acid with a base, e.g. an alkali metal hydroxide or carbonate, to form a hulupate salt, for example a alkali metal hulupate salt. Other hulupate complexes or salts can also be prepared by reaction with other complex or salt forming compounds or agents.

Accordingly, the invention further relates to a method for the preparation of a (reduced) hulupones containing matter, with a molar ratio of (reduced) hulupone to (short-chain) fatty acid of preferably at least 2, more preferably at least 5, most preferably at least 10, in particular at least 20, more in particular at least 40, comprising precipitation of the (reduced) hulupone with alkaline earth metal compounds as an alkaline earth metal complex or salt.

As used herein, the term 'short-chain fatty acid' relates in particular to a fatty acid having eight carbon atoms or less, more in particular to a fatty acid having six carbon atoms or less. The (short-chain) fatty acid can be linear or branched. The (short-chain) fatty acid can be saturated or unsaturated.

Accordingly, the invention further relates to a (reduced) hulupones containing matter, to be added during the brewing process, with a molar ratio of (reduced) hulupone to (short-chain) fatty acid of preferably at least 2, more preferably at least 5, most preferably at least 10, in particular at least 20, more in particular at least 40.

Accordingly, the invention further relates to the use of a (reduced) hulupones containing matter, with a molar ratio of (reduced) hulupone to fatty acid of preferably at least 2, more preferably at least 5, most preferably at least 10, in particular at least 20, more in particular at least 40, for the production of a brewed beverage, in particular a lager or ale beer, more in particular a light-coloured lager or ale beer.

Accordingly, the invention further relates to the use of a (reduced) hulupones containing matter, with a molar ratio of (reduced) hulupone to (short-chain) fatty acid of preferably at least 2, more preferably at least 5, most preferably at least 10, in particular at least 20, more in particular at least 40, for the production of a brewed beverage, in particular a lager or ale beer, more in particular a light-coloured lager or ale beer, (to be) stored, (to be) offered, (to be) served or (to be) consumed in a UV-VIS-transmittant bottle.

For the purpose of clarity and a concise description, features are described herein as part of the same or separate embodiments, however, it will be appreciated that the scope of the invention may include embodiments having combinations of all or some of the features described.

The following Examples illustrate the invention.

Example 1

The experiments in this Example were performed in triplicate. Based on the procedures described in U.S. Pat. Nos. 4,340,763 and 4,717,580, and self-developed methods and procedures, aqueous alkaline solutions of hulupones (present as potassium hulupates) containing 0.01 to 0.1 M of hulupones were prepared. Also 0.01 to 0.1 M aqueous alkaline solutions of isohumulones and 0.01 to 0.1 M aqueous alkaline solutions of tetrahydro-isohumulones were prepared by dilution of commercially available aqueous alkaline solutions of potassium isohumulates and potassium tetrahydro-isohumulates. To these aqueous solutions, riboflavin and cysteine were added in the same molar quantity as the amount of hulupones, isohumulones and tetrahydro-isohumulones in the 0.01 M aqueous alkaline solutions. Next, UV-VIS-transmittant clear glass bottles containing these aqueous mixtures were flushed with nitrogen gas and closed (with a metal cap), followed by irradiation with an artificial light set-up (emitting UV-A light and violet and blue VIS light) for 5 to 120 min.

It was found, by HPLC-UV analysis, that the concentration of the hulupones was about constant for varying irradiation times for the various aqueous alkaline mixtures containing hulupones, while the concentration of the isohumulones gradually decreased in the aqueous alkaline mixtures containing isohumulones as function of the irradiation time. By MS analysis it was found that, parallel with this decrease in concentration of isohumulones, there was an increase in the level of degradation products. Moreover, with increasing irradiation time, the 'skunky thiol' flavor (formation) became more and more prominent in the aqueous alkaline mixtures containing isohumulones. For the aqueous alkaline mixtures containing tetrahydro-isohumulones, a gradual decrease in the concentration of tetrahydro-isohumulones was observed for increasing irradiation times, but no 'skunky thiol' off-flavor could be detected.

The experiment was repeated with UV-VIS-transmittant green glass bottles, and it was found that also for the green glass bottles, the 'skunky thiol' off-flavor formation was avoided in the aqueous mixture containing hulupones, but not for the aqueous mixture containing isohumulones.

Example 2

The experiments in this Example were performed in duplicate. As in Example 1, aqueous alkaline solutions containing 0.1 M of respectively hulupones, isohumulones and tetrahydro-isohumulones were prepared.

Small volumes of the aforementioned aqueous alkaline solutions were added, shielded from UV-VIS irradiation, to an unhopped lager beer (5% alcohol, prepared from lager malt and with lager yeast) held in separate UV-VIS-transmittant clear glass bottles, to obtain a concentration of about 5, 10 and 15 ppm of respectively hulupones, isohumulones and tetrahydro-isohumulones in the bittered beers. Next, these clear glass bottles were flushed with nitrogen gas and closed, followed by irradiation with an artificial light set-up (emitting UV-A light and violet and blue VIS light).

The detection of the eventual presence of 'skunky thiol' was performed with a multi-person triangle test (with a trained flavor panel), with variations (in the three samples set) of one beer sample bittered with isohumulones in the set of three samples and two beer samples bittered with isohumulones in the set of three samples.

It was found that for the beers bittered with hulupones or tetrahydro-isohumulones, no 'skunky thiol' flavor could be perceived after irradiation. For the beer samples containing isohumulones, the 'skunky thiol' off-flavor (formation) became prominent even after short irradiation times.

The test was repeated with UV-VIS-transmittant green glass bottles, and it was found that also in green glass bottles, the 'skunky thiol' off-flavor formation was avoided in the lager beer bittered with hulupones.

The test was also repeated with unbittered lager beer (5% alcohol, prepared from lager malt and with lager yeast) prepared with addition of 10 ppm of lupulones during the wort boiling. The same results were obtained as for the unhopped lager beer.

An analogous test was carried out with co-addition of (reduced) humulones (humulones or tetrahydro-humulones), by using aqueous solutions of potassium humulates and tetrahydro-humulates, and again the 'skunky thiol' flavor was perceived for the beer bittered with isohumulones, and not for the beer bittered with hulupones or tetrahydro-isohumulones together with (reduced) humulones.

Example 3

The experiments in this Example were performed in duplicate. As in Example 1 and 2, aqueous alkaline solutions containing 0.1 M of respectively hulupones and isohumulones were prepared.

A volume of the aforementioned aqueous alkaline solutions was added to boiling lager wort volumes, prepared from a lager malt. The wort was boiled for 30 min after the addition of respectively hulupones and isohumulones. After cooling the wort volumes, the worts were pitched (with lager yeast), fermented, cooled, centrifuged and bottled (with nitrogen flushing) in UV-VIS-transmittant clear glass bottles. In the prepared lager beers, the concentrations were respectively about 15 ppm of hulupones and 12 ppm of isohumulones. Next, the bottled beers were irradiated with an artificial light set-up (emitting UV-A light and violet and blue VIS light).

The detection of the eventual presence of 'skunky thiol' was performed as in Example 2.

No 'skunky thiol' off-flavor was detected for the beer bittered with hulupones, in contrast with the beer samples containing isohumulones.

An analogous test was carried out with the beer prepared by addition to the wort of hulupones in the free acid form, in the form of a hulupones concentrate. The same was observed as in the test with addition of hulupones as potassium hulupates.

A similar test was performed with the beer bittered with hulupones mixed with lemonade. Again, no 'skunky thiol' off-flavor was observed for the mixture of lemonade and beer bittered with hulupones.

An analogous test was performed with co-addition of (reduced) lupulones (by using an aqueous solution of potassium lupulates) to the wort, and the same was observed as in the test without addition of (reduced) lupulones.

A similar test was carried out with co-addition of tetrahydro-isohumulones (by using an aqueous solution of potassium tetrahydro-isohumulates) to the wort, and again the 'skunky thiol' flavor was perceived for the beer bittered with isohumulones, and not for the beer bittered with hulupones together with tetrahydro-isohumulones.

An analogous test was performed with co-addition of tetrahydro-hulupones (by using an aqueous solution of potassium tetrahydro-hulupates, prepared from an aqueous solution of potassium hulupates by catalytic hydrogenation) to the wort, and no 'skunky thiol' was detected for the beer containing hulupones and tetrahydro-hulupones.

A similar test, applying hulupones as bittering agents combined with the addition of (oxygenated) hop oils (a.o. myrcene and alpha-humulene), was performed using corn as adjunct (40% substitution), next to malted barley as carbohydrate source, which was combined with the use of papaine, a proteolytic enzyme, of polyvinylpyrrolidone for polyphenol removal, and of propylene glycol alginate for foam stabilization. Again, no 'skunky thiol' was perceived for the obtained beer containing hulupones.

A similar test was performed with co-addition, next to hulupones, of hulupone derivatives with epoxidized C=C bonds in the side chains (using an aqueous solution of potassium salts thereof) to the wort, and no 'skunky thiol' was discerned for the beers containing hulupones and hulupone derivatives with epoxidized C=C bonds in the side chains.

Example 4

For the hulupone preparation, an aqueous 5 weight % solution of lupulones was prepared starting from a 0.5 M KOH solution and a purified lupulones concentrate (containing lupulones in the free acid form). To this aqueous lupulone solution in a processing vessel was added an amount of 5 weight % Pt/C catalyst (corresponding to a molar lupulone to Pt ratio of 50). Next, the closed processing vessel containing the obtained mixture was pressurized with 10 bar $O_2$ and stirred for 30 min at 75° C. Next, to the obtained reaction mixture was added $MgSO_4$ in an amount corresponding to a molar (initial) lupulone to $MgSO_4$ ratio of 0.5 while stirring. After 30 min, a precipitated phase (containing Mg hulupates) was obtained, which was, after removal of the supernatant, washed with a 0.5 M KOH solution. A hulupone precipitation efficiency of >95% was achieved, while no (short-chain) 'fatty acid type' products were detected in the precipitated phase. The precipitated phase containing Mg hulupates was then contacted with an aqueous dilute $H_2SO_4$ solution, thereby obtaining a hulupone phase (or hulupones concentrate) containing hulupones in the free acid form. Next, the hulupones were converted to potassium hulupates by contacting with an aqueous 0.5 M KOH solution. Reduced hulupones, i.e. tetrahydro-hulupones, were obtained by dissolving hulupones concentrate in ethanol, thereby obtaining a 5 weight % solution containing hulupones. To this hulupone solution in a processing vessel was added an amount of 5 weight % Pt/C catalyst (corresponding to a molar lupulone to Pt ratio of 40). Next, the closed processing vessel containing the obtained mixture was pressurized with 4 bar $H_2$ and stirred for 120 min at 25° C., thereby yielding tetrahydro-hulupones.

What is claimed is:

1. A bottled lager or ale beer, wherein said bottled lager or ale beer is in a UV-VIS-transmittant bottle, said bottled lager or ale beer comprising:
   (reduced) hulupones at a concentration of 4-150 ppm,
   wherein the bottled lager or ale beer either:
      does not further comprise isohumulones or
      has an isohulumones concentration does not exceed 2 ppm,
   wherein the fraction of (reduced) hulupones in the total of isohumulones and (reduced) hulupones is at least 75 mol %, and
   wherein said UV-VIS-transmittant bottle is a UV-VIS-transmittant clear glass bottle, a UV-VIS-transmittant green glass bottle, a UV-VIS-transmittant clear plastic bottle, a UV-VIS-transmittant green plastic bottle or combinations thereof.

2. The bottled lager or ale beer of claim 1, wherein the concentration of (reduced) hulupones is 6-100 ppm and said fraction of hulupones and/or reduced hulupones in the total of isohumulones and (reduced) hulupones is at least 95 mol %.

3. The bottled lager or ale beer of claim 1, wherein the concentration of isohumulones is below 0.5 ppm.

4. The bottled lager or ale beer of claim 3, wherein said beer is essentially free of isohumulones.

5. The bottled lager or ale beer of claim 1, wherein the concentration of reduced isohumulones is at least 0.5 ppm and below 30 ppm.

6. The bottled lager or ale beer of claim 1, further comprising one or more (oxygenated) hop monoterpenes and/or sesquiterpenes.

7. The bottled lager or ale beer of claim 1, wherein said bottled lager or ale beer has an EBC Beer Colour value below 20.

8. The bottled lager or ale beer of claim 7, wherein said bottled lager or ale beer is stored, offered, or served in said UV-VIS-transmittant bottle, or consumed from said UV-VIS-transmittant bottle; and wherein said UV-VIS-transmittant bottle is a clear glass bottle, a green glass bottle or a clear plastic bottle.

9. A bottled lager or ale beer comprising:
(reduced) hulupones,
wherein the concentration of (reduced) hulupones in said lager or ale beer is 4-150 ppm;
wherein the concentration of isohumulones is below 2 ppm; wherein the fraction of hulupones and/or reduced hulupones in the total of isohumulones and (reduced) hulupones is at least 90 mol %;
wherein said bottled lager or ale beer is in a UV-VIS-transmittant bottle;
wherein said UV-VIS-transmittant bottle is a UV-VIS-transmittant clear glass bottle, a UV-VIS-transmittant green glass bottle, a UV-VIS-transmittant clear plastic bottle, a UV-VIS-transmittant green plastic bottle or combinations thereof and
wherein said bottled lager or ale beer has an EBC Beer Colour value below 20.

10. A bottled lager or ale beer according to claim 1, wherein said fraction of hulupones and/or reduced hulupones in the total of isohumulones and (reduced) hulupones is at least 95 mol % and wherein the beer is essentially free of isohumulones or comprises isohumulones in a concentration of less than 0.5 ppm.

11. A bottled lager or ale beer according to claim 1, wherein the flavor of 3-methyl-2-butene-1-thiol (skunky thiol) in the bottled lager or ale beer is not perceptible after UV-VIS irradiation of the bottled lager or ale beer.

12. A bottled lager or ale beer according to claim 9, wherein said fraction of hulupones and/or reduced hulupones in the total of isohumulones and (reduced) hulupones is at least 95 mol % and wherein the beer is essentially free of isohumulones or comprises isohumulones in a concentration of less than 0.5 ppm.

13. A bottled lager or ale beer according to claim 9, wherein the flavor of 3-methyl-2-butene-1-thiol (skunky thiol) in the bottled lager or ale beer is not perceptible after UV-VIS irradiation of the bottled lager or ale beer.

* * * * *